INVENTORS
WILLIAM A. FLETCHER
MAX E. TODD
CARL D. MOORE
BY
THEIR ATTORNEY

INVENTORS
WILLIAM A. FLETCHER
MAX E. TODD
CARL D. MOORE
BY
THEIR ATTORNEY

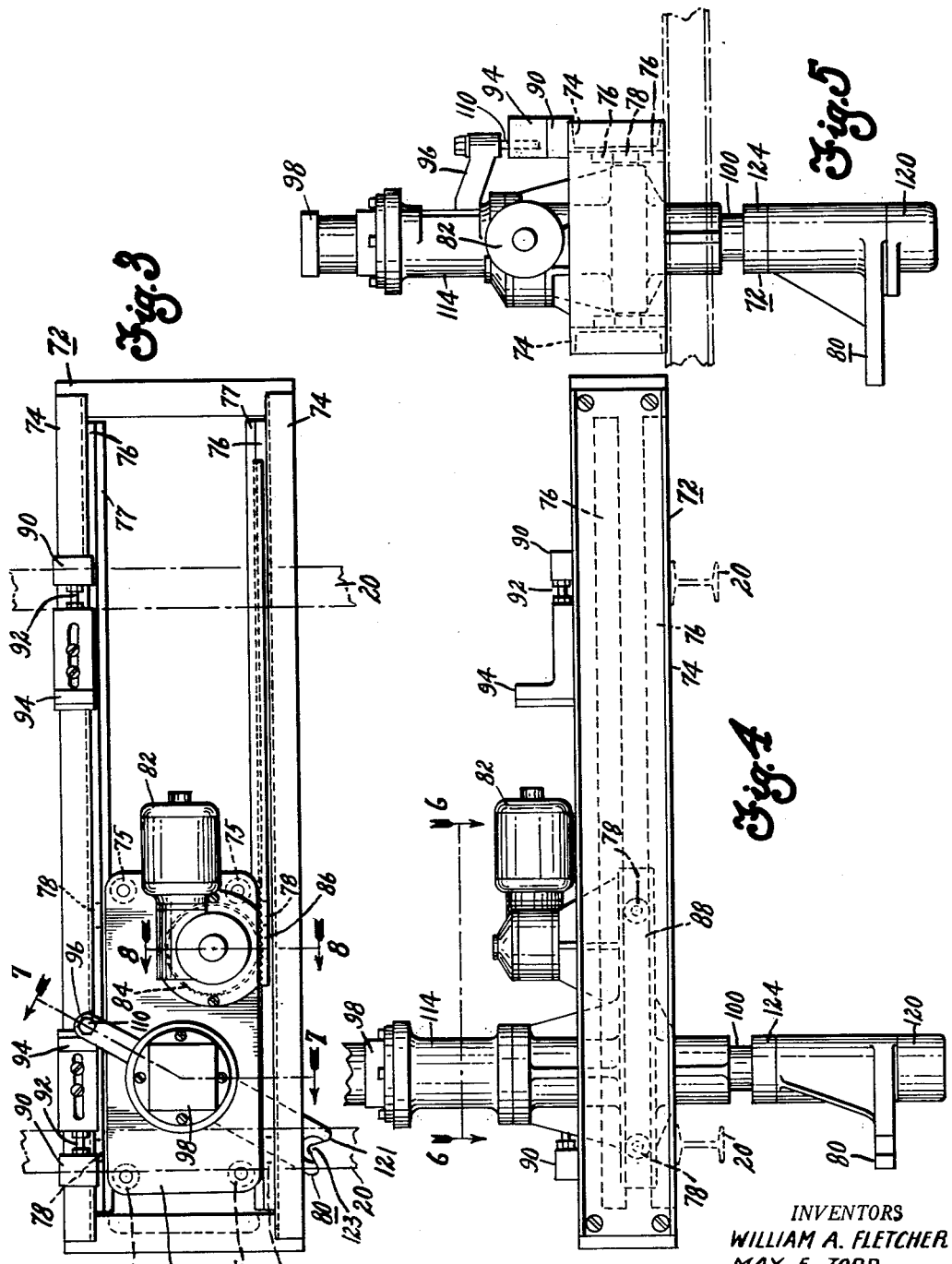

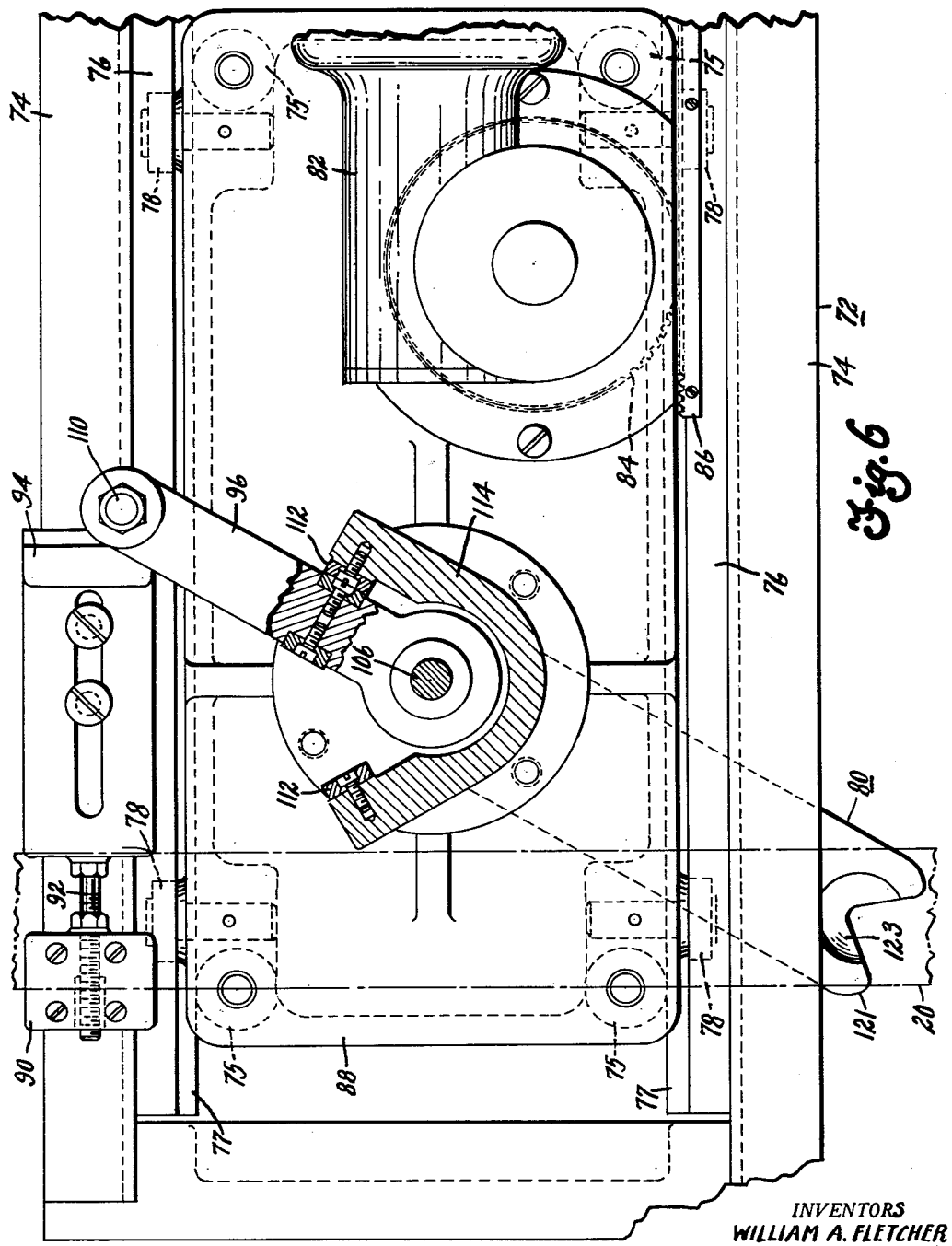

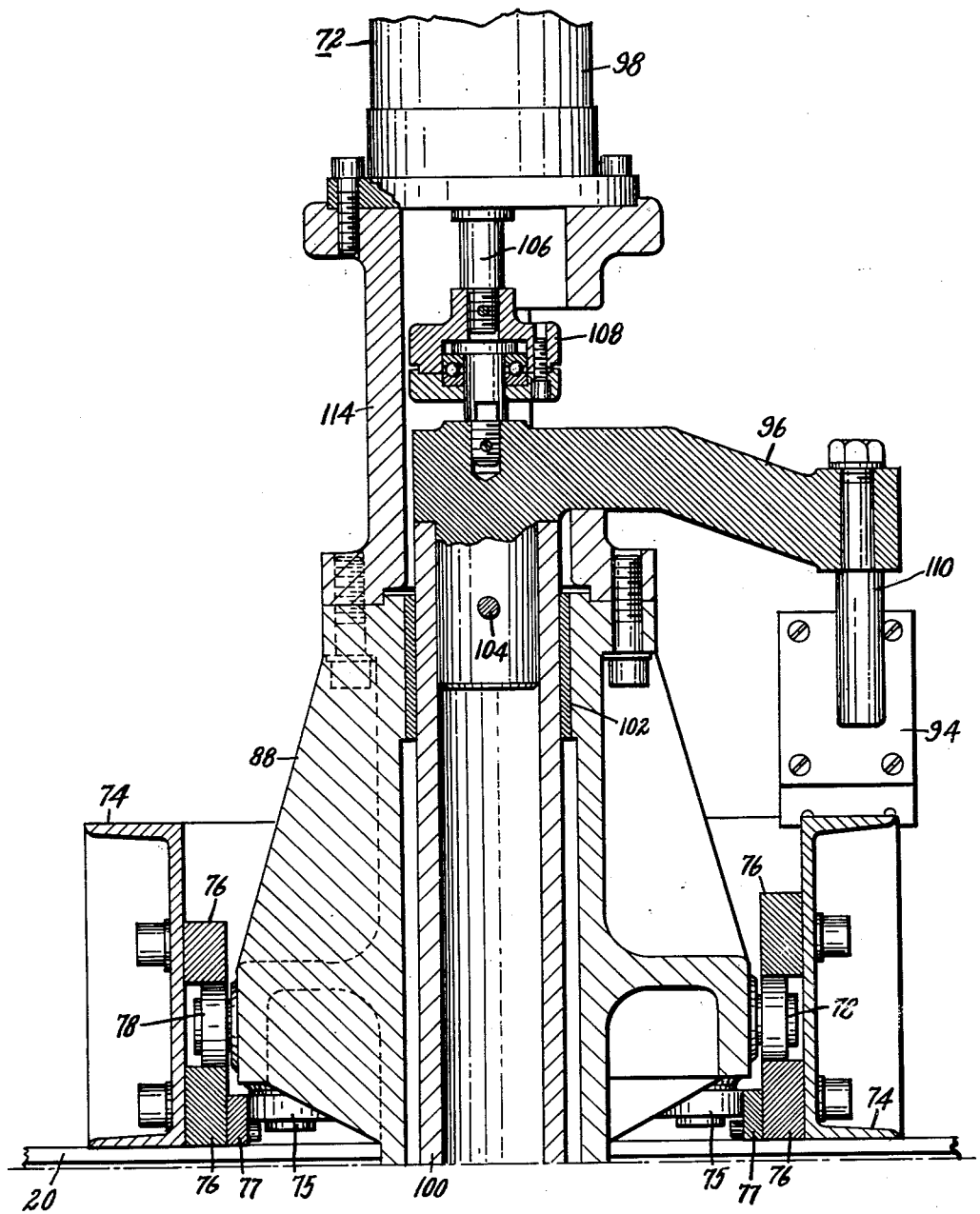

INVENTORS
WILLIAM A. FLETCHER
MAX E. TODD
CARL D. MOORE
BY John T. Marvin
THEIR ATTORNEY

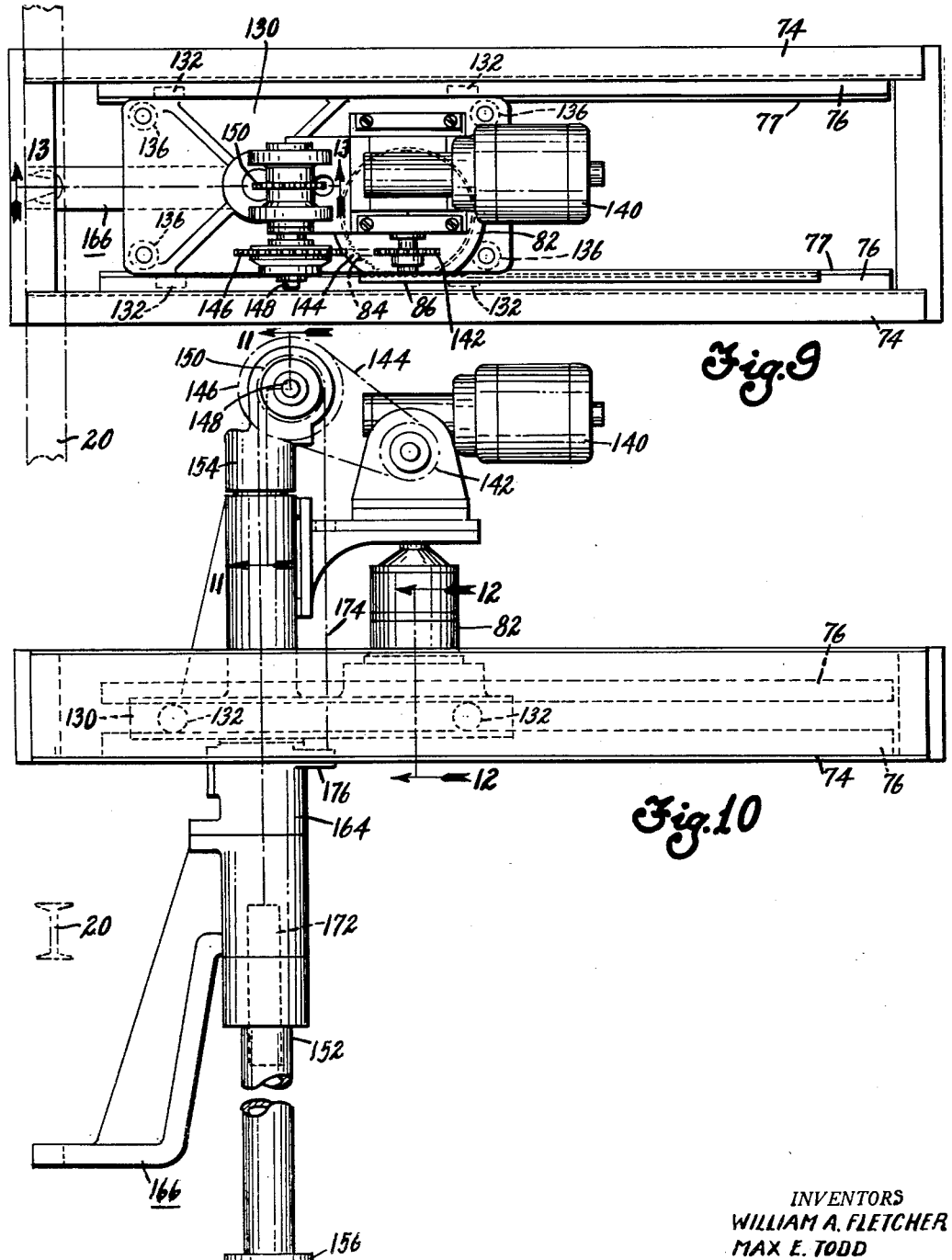

INVENTORS
WILLIAM A. FLETCHER
MAX E. TODD
CARL O. MOORE
BY John T. Marvin
THEIR ATTORNEY June 27, 1961 W. A. FLETCHER ET AL 2,989,928
CONVEYOR SYSTEM
Filed Jan. 9, 1956 16 Sheets-Sheet 10

INVENTORS
WILLIAM A. FLETCHER
MAX E. TODD
CARL D. MOORE
BY John T. Marvin
THEIR ATTORNEY

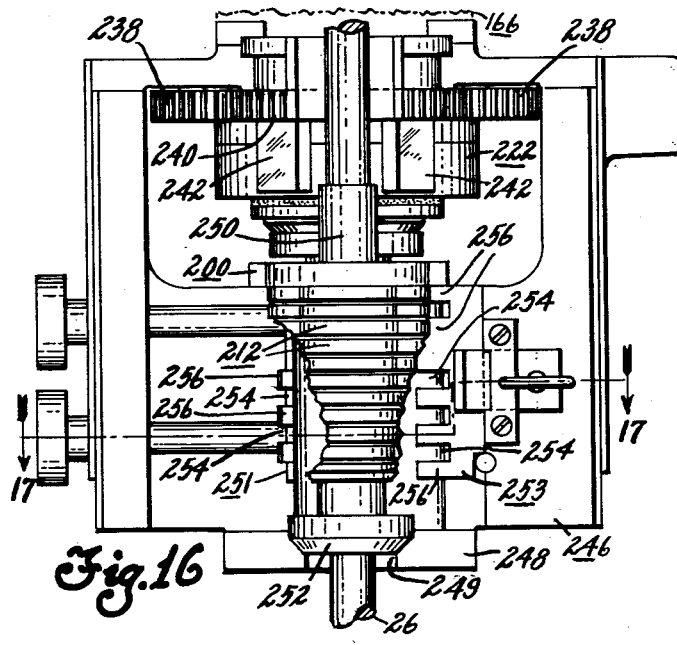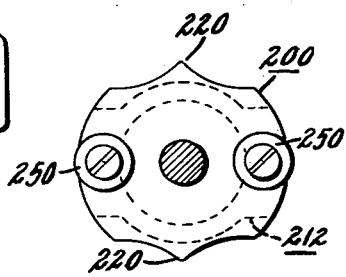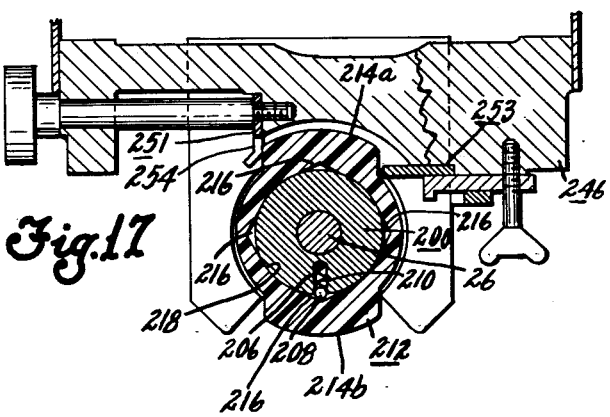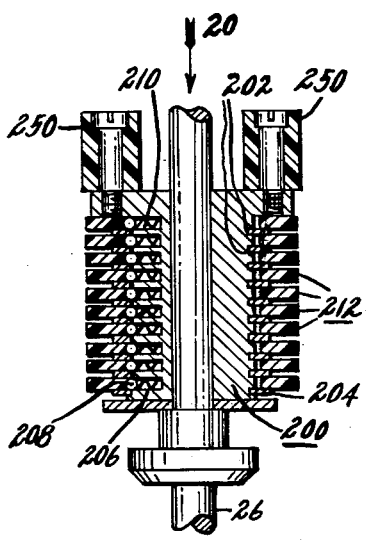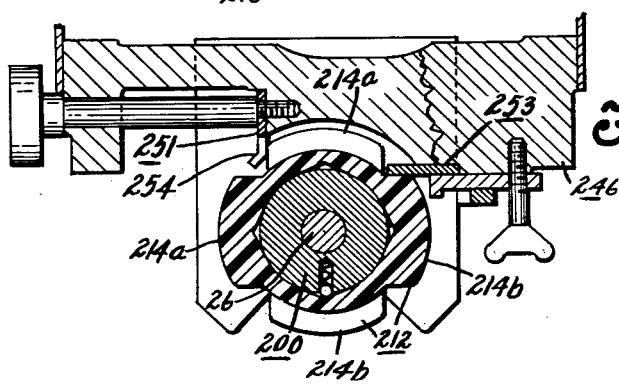

INVENTORS
WILLIAM A. FLETCHER
MAX E. TODD
CARL D. MOORE
BY
THEIR ATTORNEY

June 27, 1961

W. A. FLETCHER ET AL 2,989,928

CONVEYOR SYSTEM

Filed Jan. 9, 1956

INVENTORS
WILLIAM A. FLETCHER
MAX E. TODD
CARL D. MOORE
BY John T. Marconi
THEIR ATTORNEY June 27, 1961 W. A. FLETCHER ET AL 2,989,928
CONVEYOR SYSTEM
Filed Jan. 9, 1956 16 Sheets-Sheet 16

INVENTORS
WILLIAM A. FLETCHER
MAX E. TODD
CARL D. MOORE
BY
THEIR ATTORNEY

United States Patent Office 2,989,928
Patented June 27, 1961

2,989,928
CONVEYOR SYSTEM
William A. Fletcher, Daleville, Max E. Todd, Windfall, and Carl D. Moore, Anderson, Ind., assignors to General Motors Corporation, Detroit, Mich., a corporation of Delaware
Filed Jan. 9, 1956, Ser. No. 557,929
13 Claims. (Cl. 104—88)

This invention relates to conveyor apparatus and control systems therefor and more particularly to a conveyor apparatus and control system which will selectively cause the transfer of parts between the various parts of the conveyor.

It is now a widely accepted fact that full automation is being achieved by degrees in our present day factories and it is toward this goal of full automation that the present invention is directed. A study of the existing conveyor systems as used in our present day factories will reveal that each leaves much to be desired if full automation of the factory is to be achieved. Generally, these conveyors are inadequate as they are inflexible, that is, they can be modified only with difficulty to meet changing demands, they are not selective, and, as such, are not adapted to handle more than one particular item at more than one rate or they are cumbersome, costly and require a great deal of human attention and head room for their installation.

The present invention is directed to a conveying system which possesses none of the objectionable characteristics inherent in the conveyor systems as heretofore known. The present invention is directed to a conveying system and the parts therefor which can be readily modified to satisfy changing factory requirements and can be installed without sacrifice of valuable floor space and head room. This conveyor system further is arranged to store a multitude of different parts and select and transfer the selected parts over any distance in the factory without human attention. The latter fact is very important in the automation of our factories.

The present invention is directed to an entire conveying system as well as the individual parts therefor and utilizes many of the parts now used in conveying systems which are installed in our modern factories. The conveying system, according to the present invention, preferably includes a storage conveyor whereon a multitude of different parts as used in the factory may be carried. In fact, when the conveyor system, according to the present invention, is used, the entire inventory of the factory may be placed thereon and continuously move through the factory so the parts, both finished and unfinished, may be routed through the factory without human attention. The conveyor system also includes a dispatch conveyor which is used to move certain selective parts, as may be dictated by the factories' requirements, to other conveyors which will transfer the parts from the dispatch conveyor to work stations. All of the conveyors heretofore mentioned will be preferably supported on the roof trusses of a factory where they will not utilize any floor or head room and thereby permit the installation of the machinery in any desired location.

The transfer mechanism, according to the present invention, will selectively transfer any one, or a predetermined category of parts, between conveyors over any distance and is so controlled that it will constantly maintain a predetermined inventory of parts on any of the conveyors. The present invention also includes a transfer mechanism which may be installed to transfer parts between two conveyors which are vertically and horizontally spaced or to a work station where the part which is carried on the conveyor will have the necessary manufacturing operations performed thereon. After the manufacturing operations have been performed, this transfer mechanism will not only return the parts to the conveyor system, but it will automatically index certain parts of the apparatus, according to the present invention, so that the part on which the manufacturing operations have been performed will be identified by other mechanisms to cause the part to move through a desired route in the factory so that other operations may be performed thereon.

It is an object of the present invention to provide an improved conveyor system which includes a mechanism which will transfer parts from one conveyor to another regardless of the horizontal or vertical distance between the conveyors.

Another object of the present invention is to provide a conveyor system with an improved control system which will sense a predetermined category of parts which are continuously moving on one conveyor and to cause an automatic transfer of the parts of that category only to another conveyor or to a work station without regard to the vertical or horizontal distance between the conveyors or the work station and to control the return of said parts between the conveyors.

A further object of the present invention is to provide a conveyor system with a storage conveyor, a dispatch conveyor, and a work station and to cause the automatic transfer of a predetermined category of parts only between the conveyors and the work station regardless of the vertical and horizontal distance therebetween.

Another object of the present invention is to provide an adjustable index mechanism on each of the hooks whereon the parts to be conveyed are placed, which mechanism includes a plurality of movable discs which can be moved to predetermined positions so a plurality of combinations of settings can be formed to indicate the category of parts which are carried on the hooks.

A still further object of the present invention is to provide an adjustable indicator mechanism on each of the hooks whereon the parts to be conveyed are placed, which mechanism includes a plurality of discs that are stacked in a fixed axial position on said hooks and which discs are individually rotatable so a plurality of combinations of settings of the discs can be formed to indicate the category of parts which are carried on the hooks.

Another object of the present invention is to provide an improved mechanism for transferring parts between two continuously moving hangers on two different conveyors or to transfer parts between two different continuously moving hangers on the same conveyor which transfer mechanisms will operate automatically and select certain parts only to be transferred and will cause said transfer to occur without regard to the vertical and horizontal distance between the points of transfer.

A further object of the present invention is to provide a conveyor system wherein the automatic transfer of parts is controlled and, further, to provide a conveyor system wherein a predetermined inventory of a plurality of preselected parts is constantly maintained on the continuously moving hangers carried on a conveyor.

Further objects and advantages of the present invention will be apparent from the following description, reference being had to the accompanying drawings wherein preferred embodiments of the present invention are clearly shown.

In the drawings:

FIGURE 1 diagrammatically, in perspective, shows a simplified version of the conveyor system and certain of the parts therefor according to the present invention.

FIGURE 2 diagrammatically, in perspective, shows one form of a transfer mechanism for transferring parts between conveyors and one form of a transfer mechanism for transferring parts between a conveyor and a work station, according to the present invention.

FIGURES 3, 4, 5, 6, 7, 7a and 8 are various views of a transfer mechanism as shown in FIGURE 2 according to the present invention wherein:

FIGURE 3 is a top plan view of the transfer mechanism;

FIGURE 4 is a side view of the mechanism in FIGURE 3;

FIGURE 5 is an end view of the mechanism in FIGURE 3;

FIGURE 6 is an enlarged view along line 6—6 in FIGURE 4;

Figure 7A:
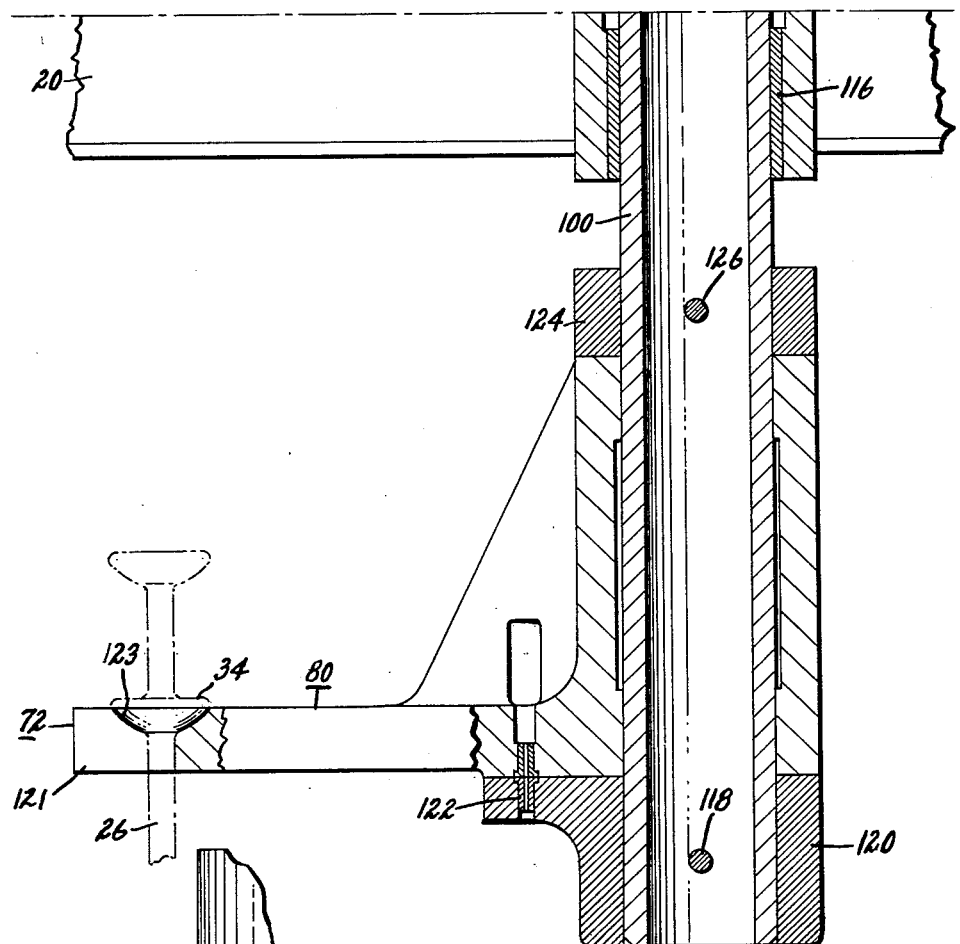
Figure 8:
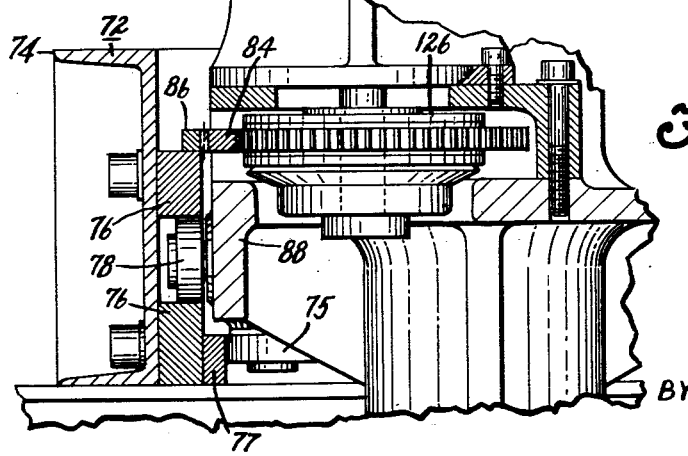

FIGURES 7 and 7a are enlarged views showing top and bottom sections of the apparatus along line 7—7 in FIGURE 3; and, FIGURE 8 is a view along line 8—8 in FIGURE 3.

Figure 2:
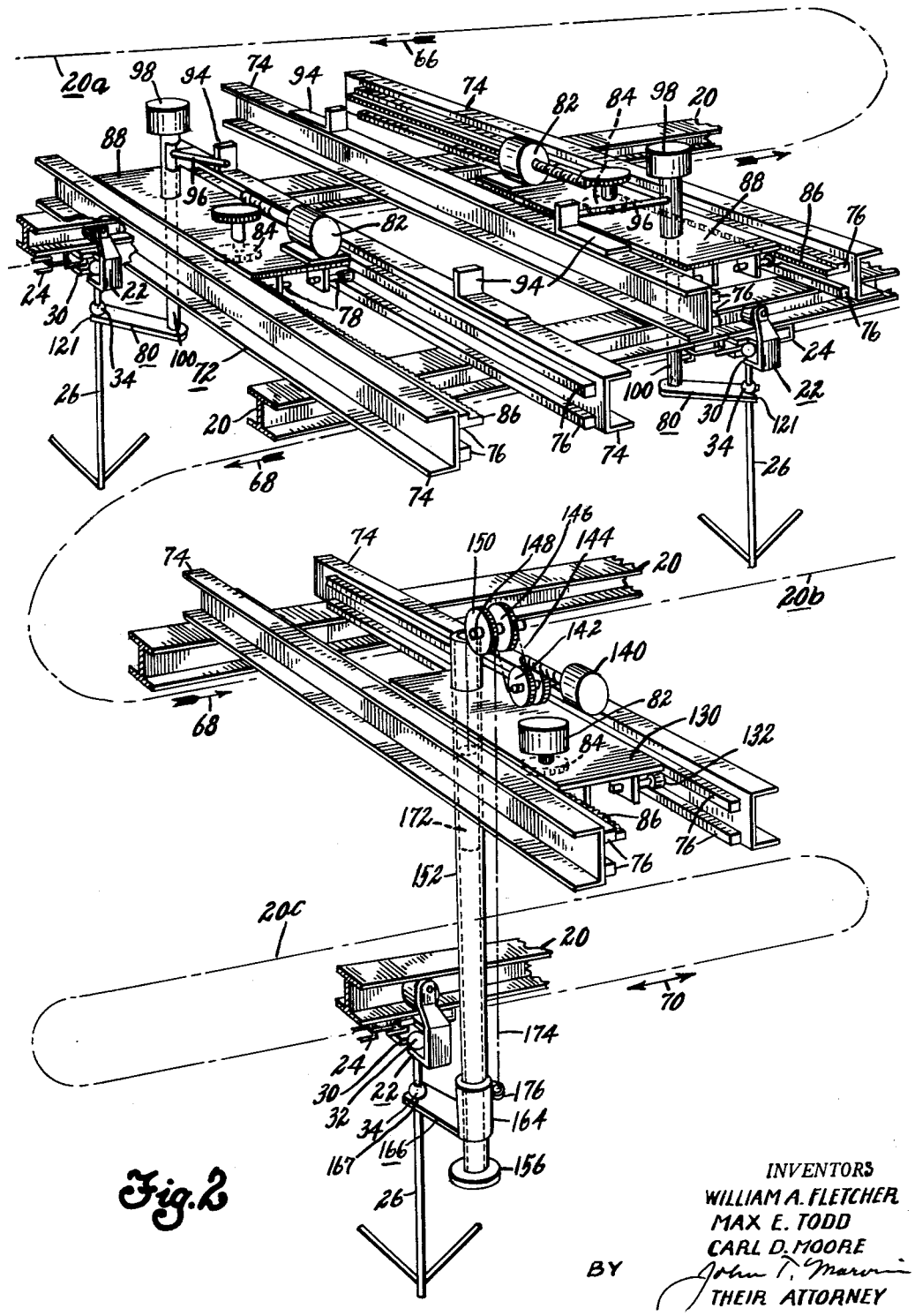
Figure 11:
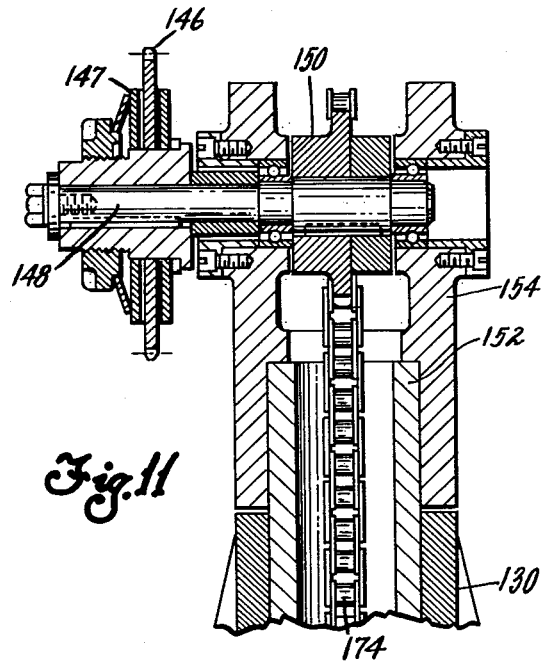
Figure 12:
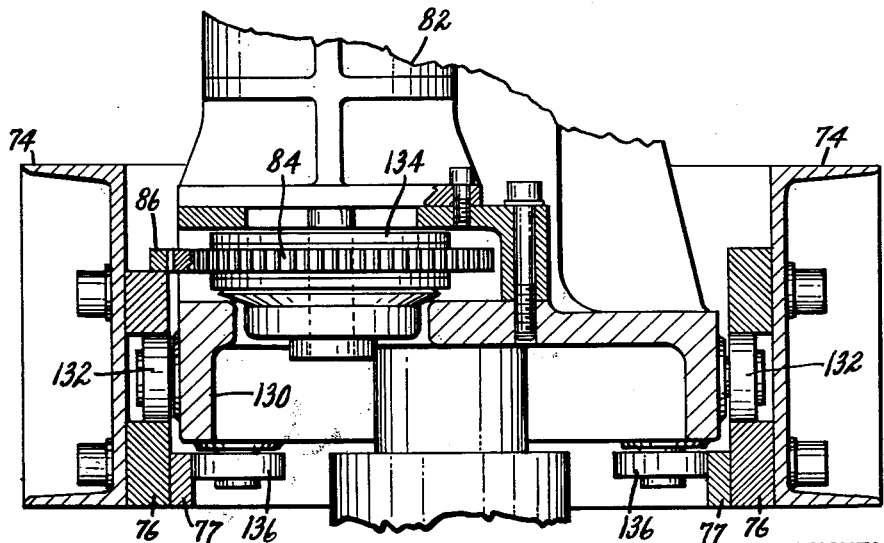
Figure 13:
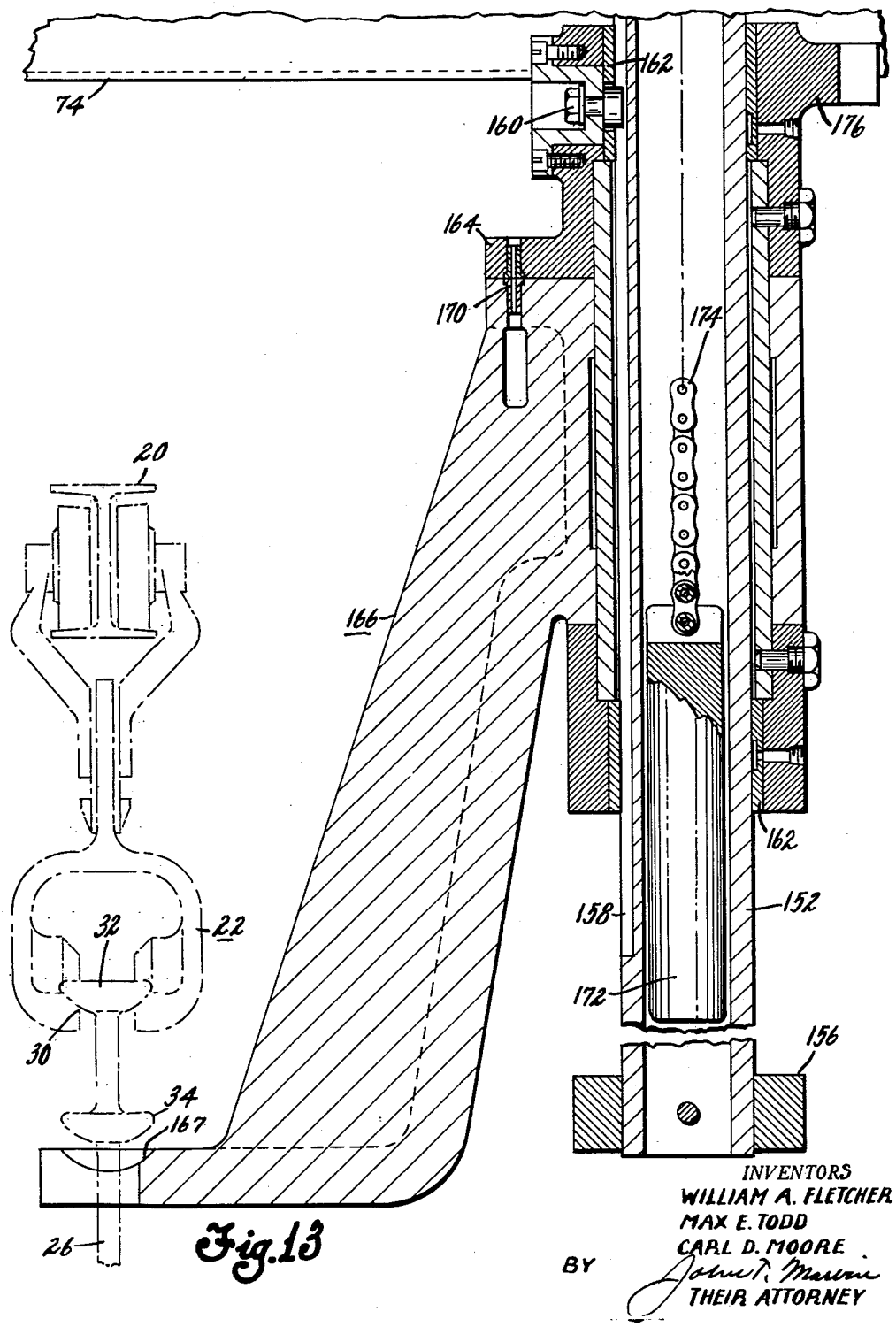

FIGURES 9, 10, 11, 12 and 13 are views of the work station as shown in FIGURE 2 wherein:

FIGURE 9 is a top view;

FIGURE 10 is a side view;

FIGURE 11 is an enlarged view along line 11—11 in FIGURE 10;

FIGURE 12 is an enlarged sectional view along line 12—12 of FIGURE 10; and,

FIGURE 13 is an enlarged sectional view along line 13—13 of FIGURE 9 looking downward from the lower section of the transfer mechanism.

Figure 14:
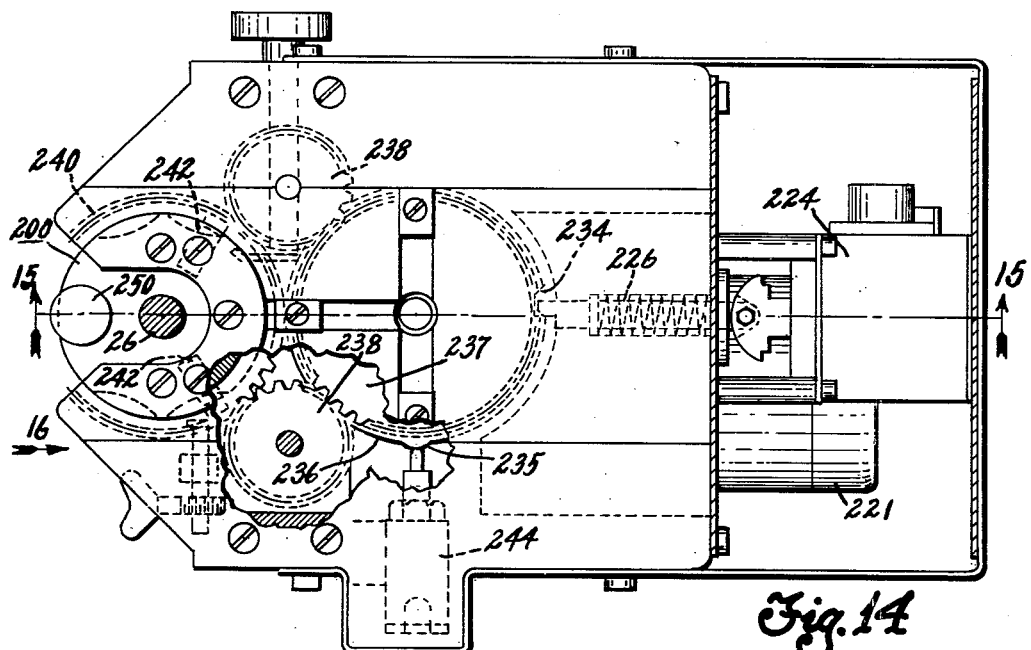
Figure 15:
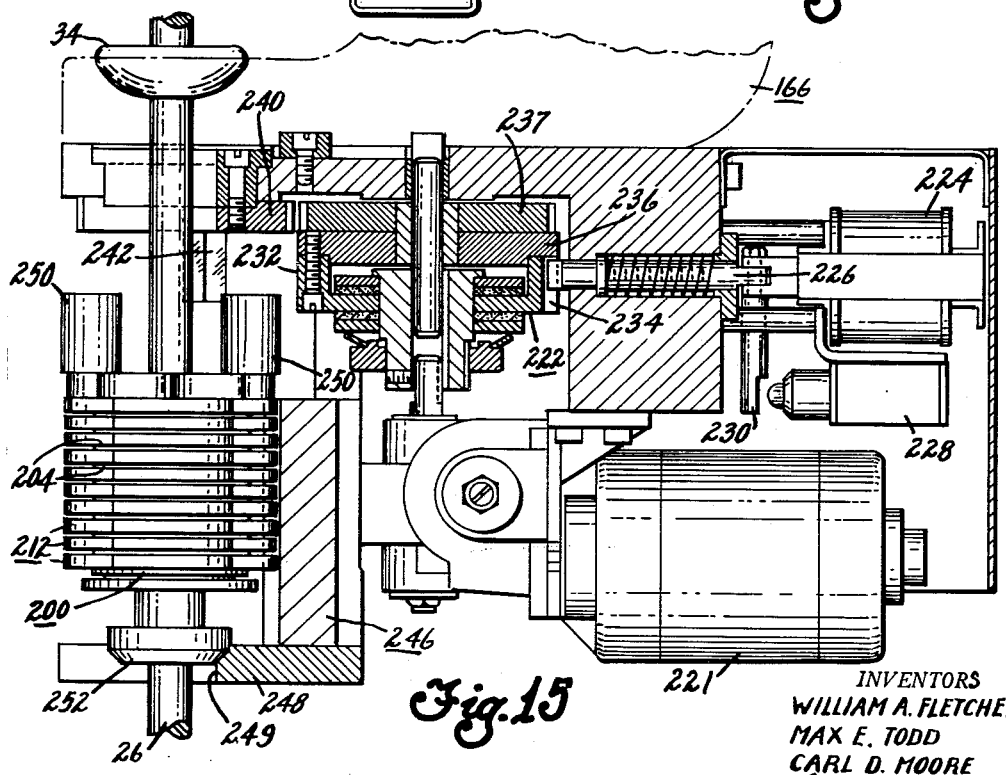

FIGURES 14, 15, 16, 17, 18, 19 and 20 are views showing the cam selector mechanism which may be secured on the work station mechanism as shown in FIGURES 9 through 13 wherein:

FIGURE 14 is a top plan view of the cam setting mechanism according to the present invention;

FIGURE 15 is a view, partly in section, along line 15—15 in FIGURE 14;

FIGURE 16 is an end view of the apparatus shown in FIGURE 14 taken in the direction of arrow 16;

FIGURE 17 is a view taken along line 17—17 in FIGURE 16 showing the selector cams of the apparatus in one position;

FIGURE 18 is a view, partly in section, along line 17—17 in FIGURE 16 showing the selector cams in another position;

FIGURE 19 is a view, partly in section, showing the arrangement of the selector cams on a parts hook; and, FIGURE 20 is a view taken in the direction of arrow 20 in FIGURE 19.

Figure 21:
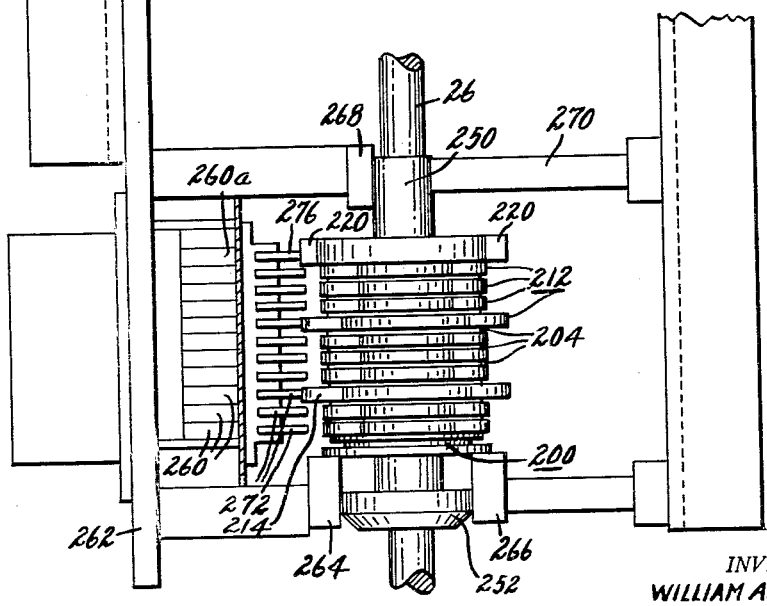

FIGURE 21 is a side view of the sensing switch unit for the conveyor system according to the present invention.

Figure 22:
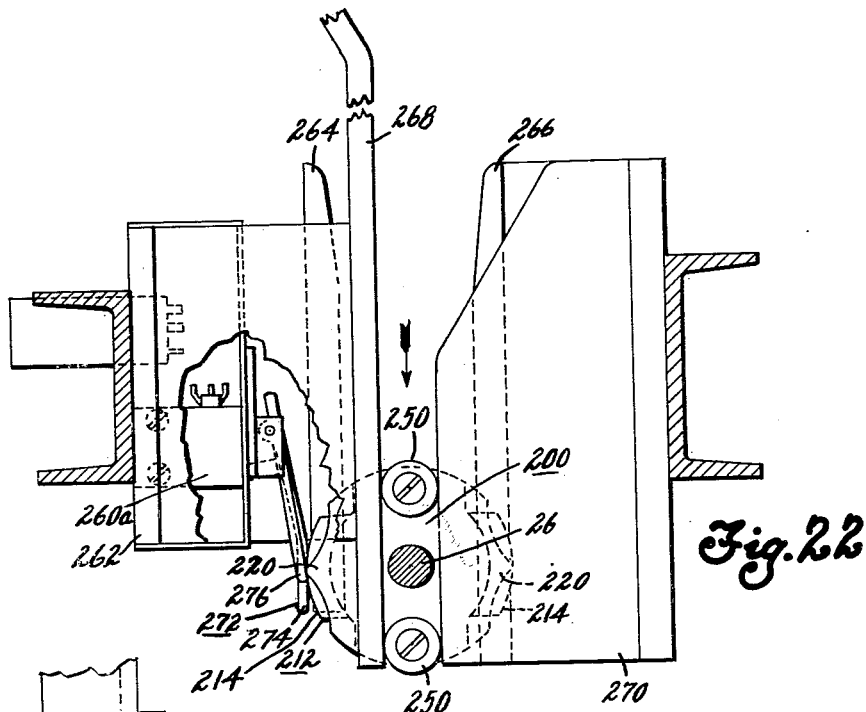

FIGURE 22 is a top view of the sensing switch unit shown in FIGURE 21.

Figure 23:
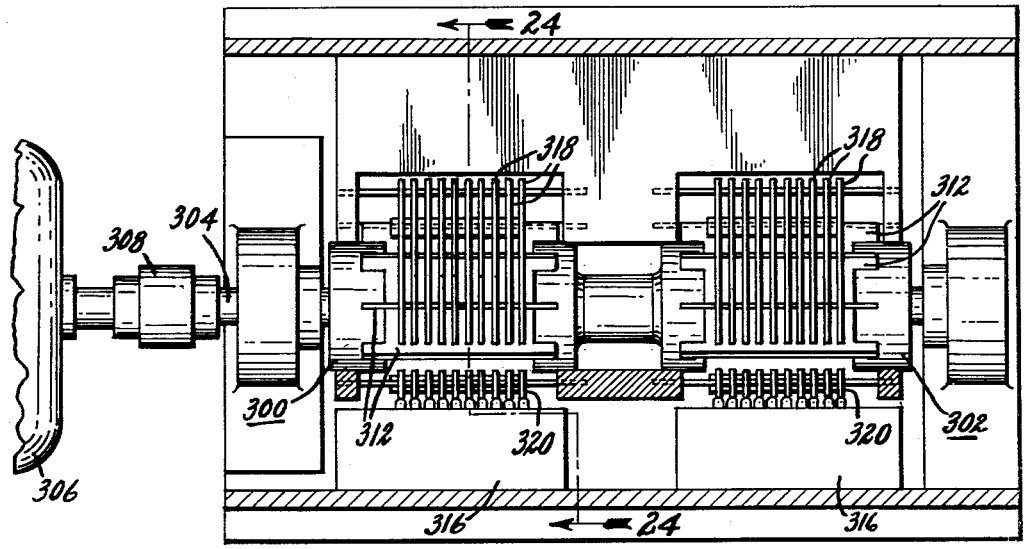

FIGURE 23 is a plan view of a parts selector according to the present invention.

Figure 24:
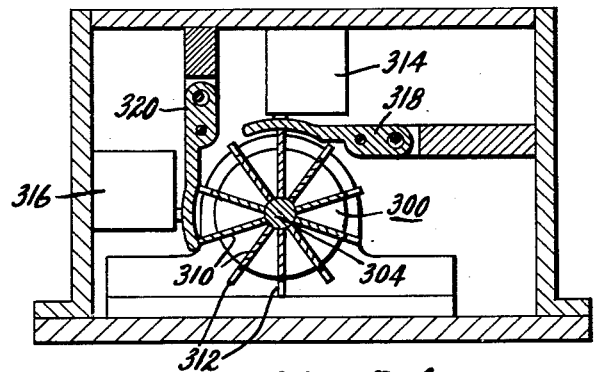

FIGURE 24 is a view, partly in section, along the line 24—24 in FIGURE 23.

Figure 25:
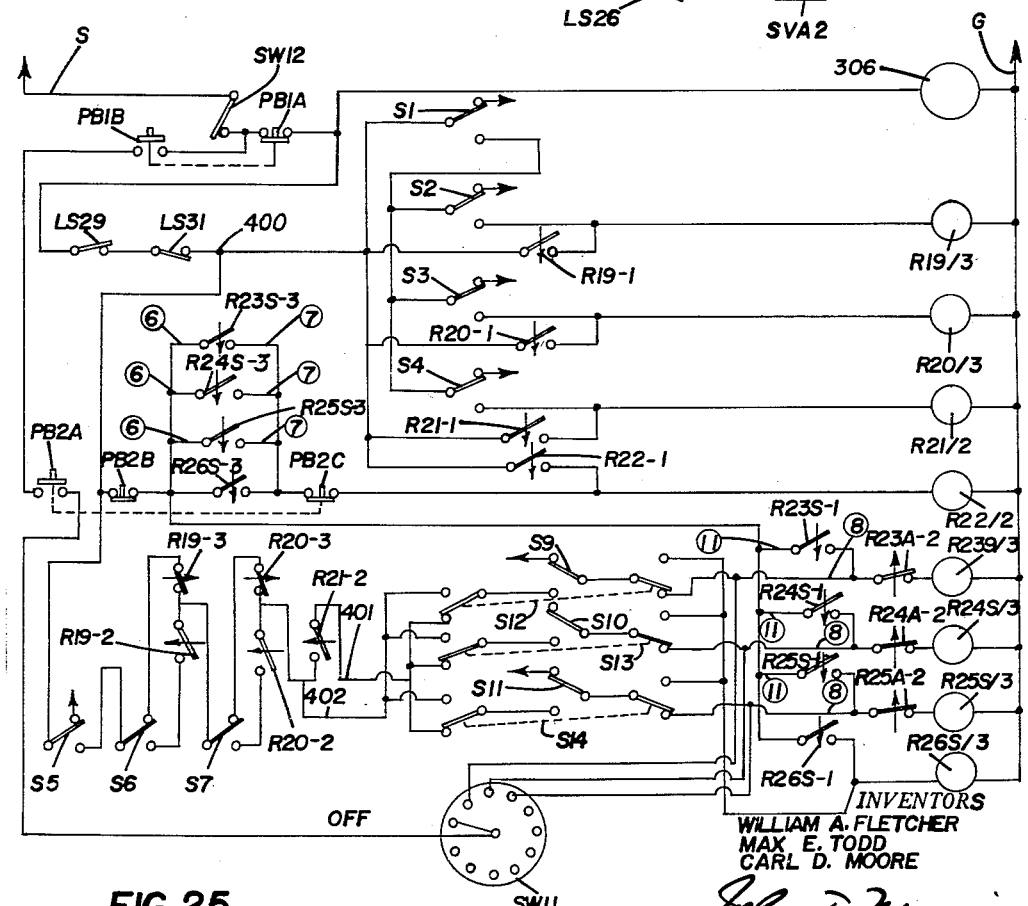

FIGURE 25 diagrammatically shows a wiring diagram of an electric circuit network for causing the motor circuit for one of the transfer arms to become energized to remove the parts hooks from one conveyor and transfer the hooks to another.

Figure 26:
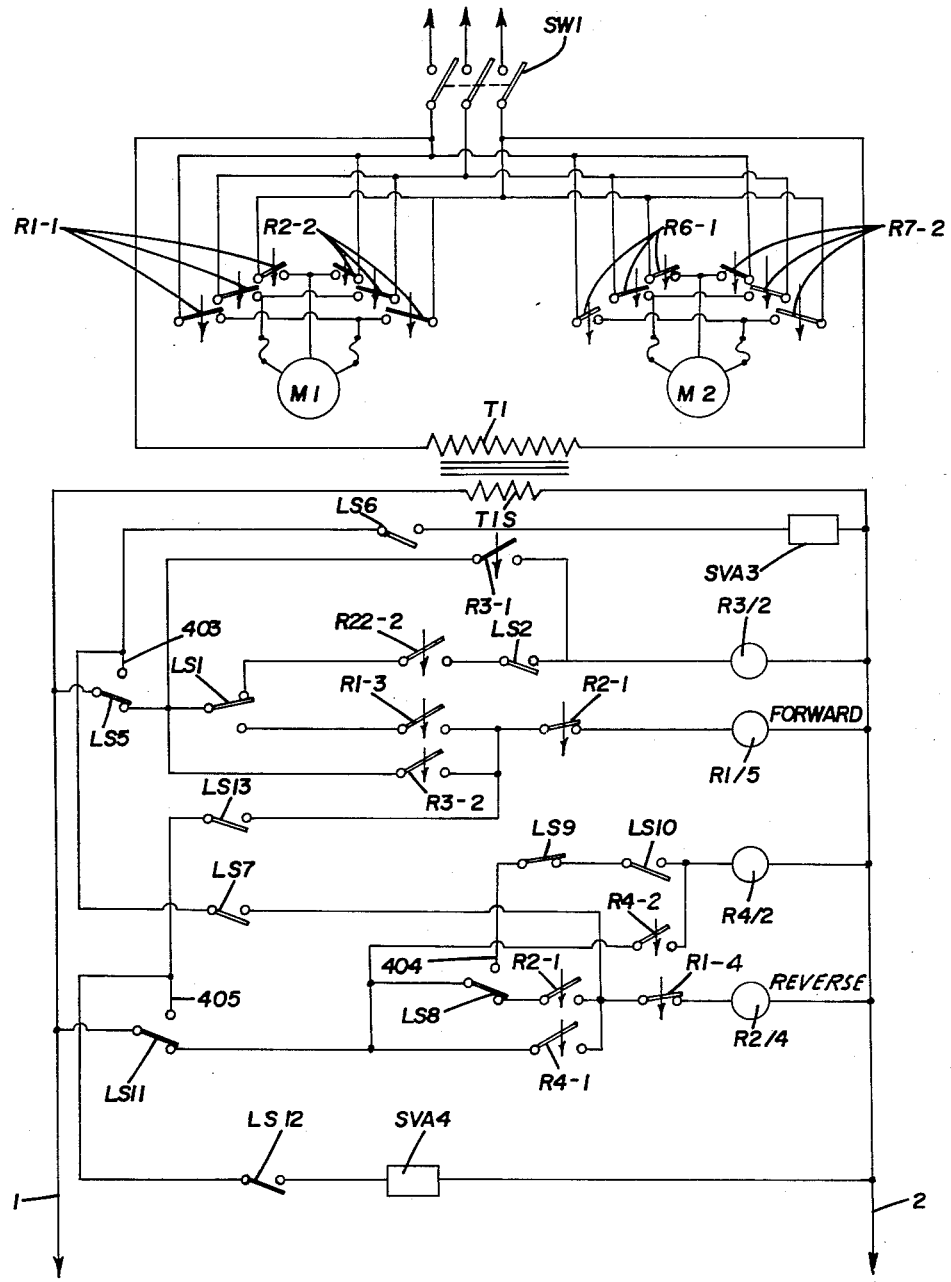

FIGURE 26 diagrammatically shows a wire diagram of another electric circuit network for causing the transfer mechanism to move a part hook, initially moved when the circuit in FIGURE 26 was energized, to a conveyor.

Figure 27:
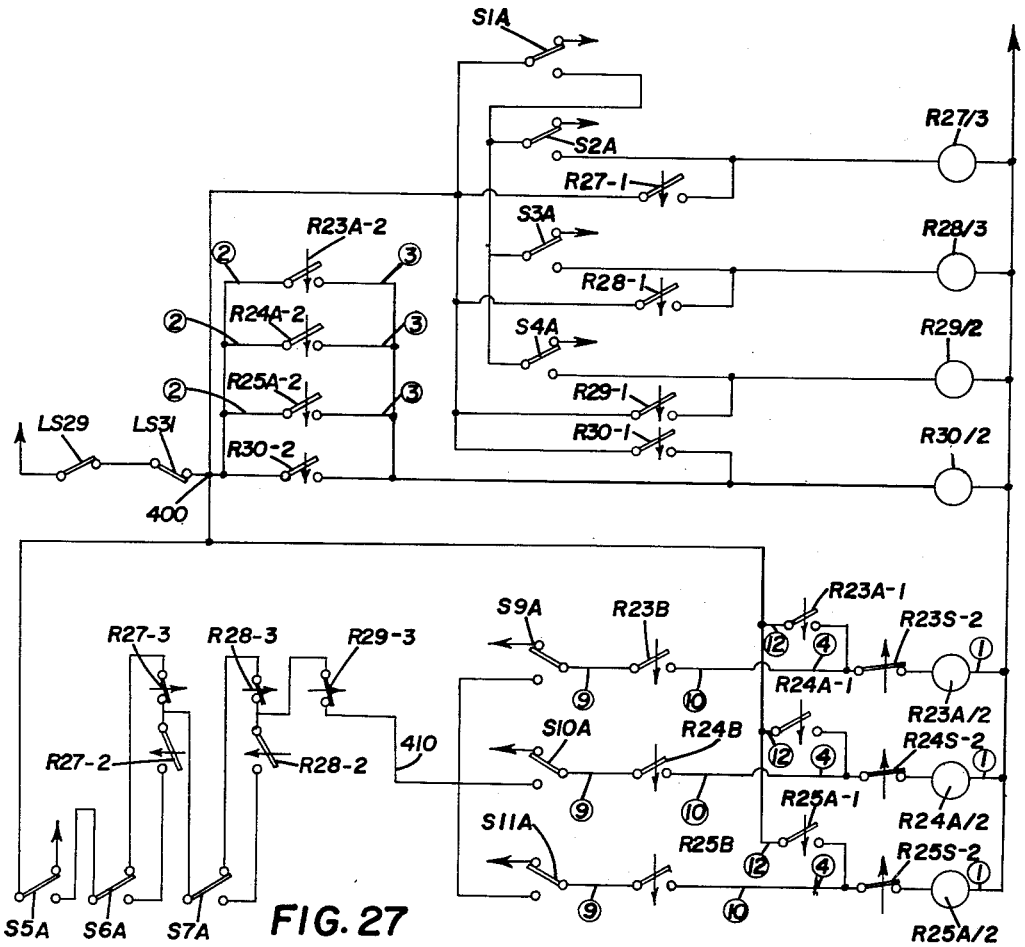

FIGURE 27 shows a crcuit diagram which is responsive to the circuit shown in FIGURE 26.

Figure 28:
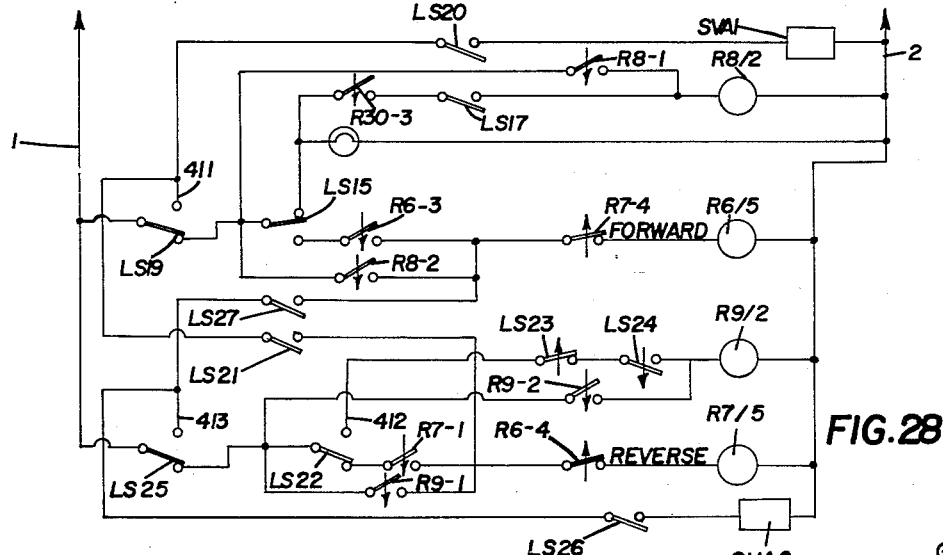

FIGURE 28 shows a circuit diagram which is responsive to the circuit shown in FIGURE 28.

Figure 29:
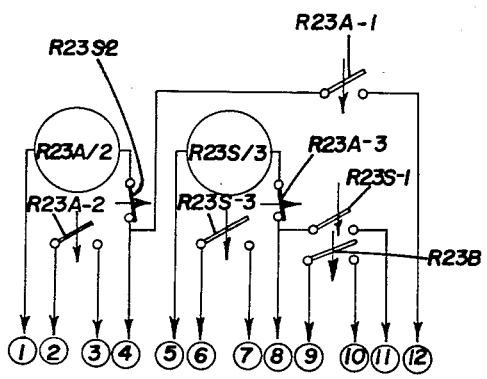

FIGURE 29 diagrammatically shows a wire diagram of a circuit for a relay as used in the circuits shown in FIGURES 25 and 26.

Figure 30:
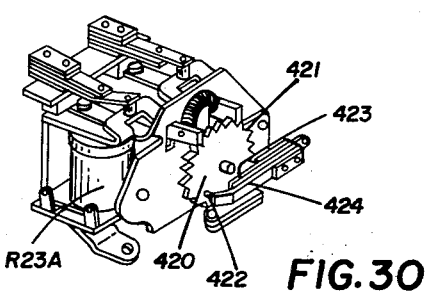

FIGURE 30 is a perspective view of an add and subtract relay.

Figure 1:
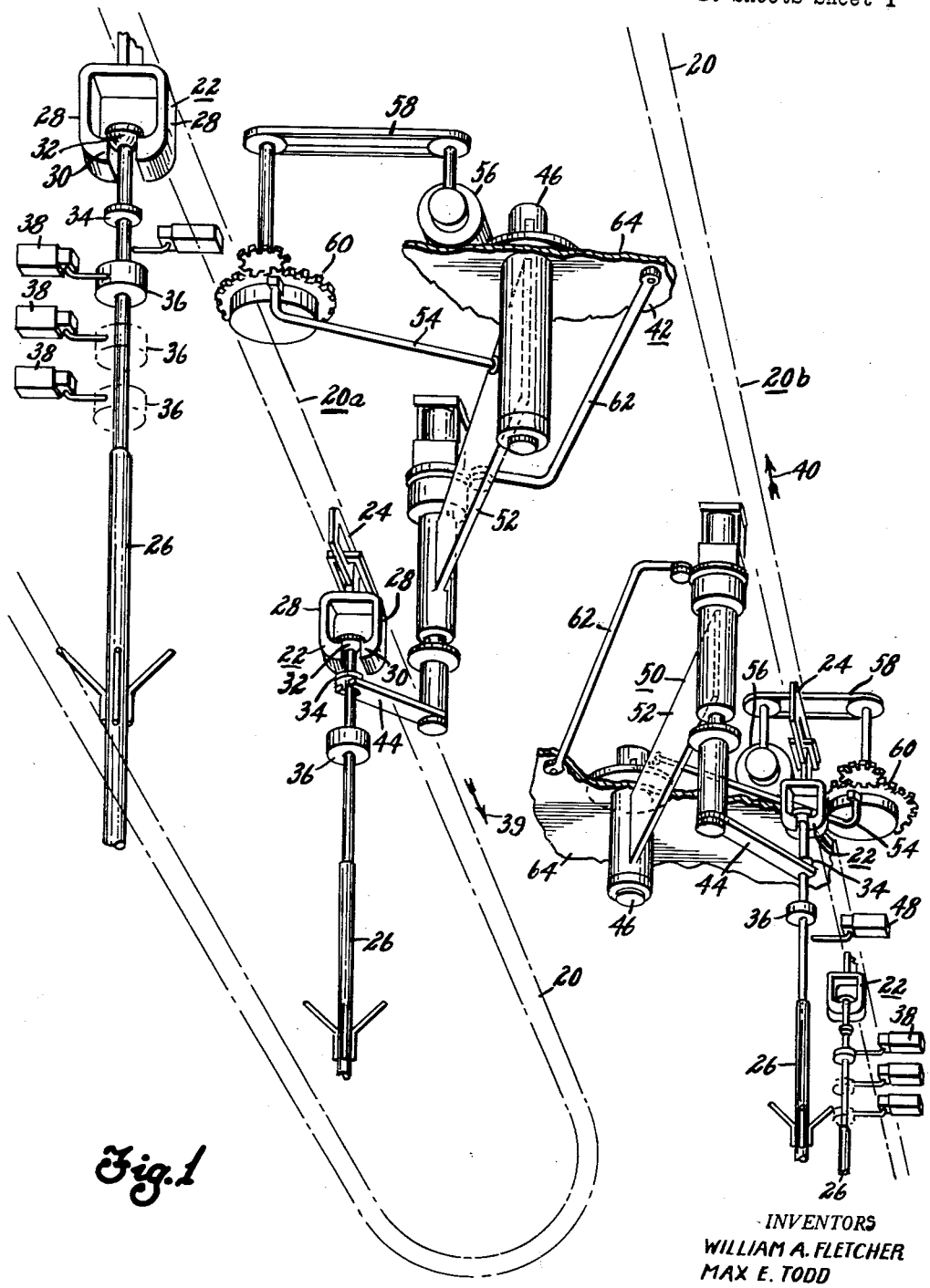

In the drawings, and in FIGURE 1 particularly, a simplified version of the conveyor system according to the present invention is shown. This drawing and description is presented at this time to facilitate the understanding of the more complicated systems which will be hereinafter described; and is not to be construed as a limitation nor is it to be taken as including all the novel features of the present invention.

Each of the individual conveyors of the conveying system shown comprises a single I-beam track 20 that is formed into a closed loop whereon a plurality of spaced hangers or sockets 22 are suspended in rolling engagement. The hangers 22, in turn, support an endless flexible link type chain 24 which causes the conveyor's hangers 22 to continuously move at a constant rate along the closed path of track 20. The hangers 22 are each provided with spaced sides 28 having bifurcated ends which are inwardly turned to form a socket 30. This socket 30 is preferably shaped to receive a ball or semi-spherical end 32 located on the upper end of a parts hook or tree 26 and provides for an easy engagement and disengagement between the hangers and the hooks 26. The hooks 26 are provided with a fixed annular lug 34 which may also have a semi-spherical surface and which is engaged by transfer mechanisms which will be hereinafter described.

If desired, the conveyor system shown may be arranged to include a plurality of conveyors such as a storage conveyor 20a, a dispatch conveyor 20b and a work station conveyor, not shown, which conveyors are arranged so that the parts carried on one may be readily transferred to the other by the transfer mechanism shown in the drawings.

The parts trees 26, as shown in FIGURE 1, are each provided with a plurality of movable annular indexing or indicating rings 36 which, as shown in the embodiment in FIGURE 1 only, are axially movable to selected predetermined positions on the tree as required. The location of rings 36 on the part trees is used to indicate the particular presence of a part on the hook 26. These indicating rings 36, when properly located on hooks 26, will actuate suitably located stationary switches 38 when the hooks 26 are moved past the switches 38 by the conveyor. When the proper switch 38 is closed, a transfer mechanism will be actuated to move the particular hook 26, as detected by the switch 38, from one conveyor to another. For example, if it is assumed that the conveyor 20a is travelling in the direction of arrow 39 and the conveyor 20b is travelling in the direction of arrow 40, then the transfer mechanism 42 will move the hooks 26 from the conveyor 20a to the conveyor 20b when the proper switch 38 is actuated through its engagement with ring 36. When switch 38 is closed, the transfer mechanism 42 through other control circuits will become operative and horizontally move from its neutral position, which is mid-way between the conveyors, in the direction of the conveyor 20a until the socket on the end of arm 44 intersects the path of travel of hooks 26. In this position, the arm 44, which is vertically lowered and raised by an air-cylinder 46, receives the hook 26. The hook 26 is hung on arm 44 when lug 34 on the tree is engaged by the arm 44 as the conveyor 20a moves along. After the arm 44 has the hook 26 hung thereon, the cylinder 46 raises the arm 44 and a mechanism, which will be hereinafter described, rotates the arm 44 toward the transfer conveyor until it arrives at a position mid-way between the conveyors. In this position, the arm 44 dwells until a stationary switch 48 located adjacent the conveyor 20b, detects the presence of an empty hanger 22. This will permit a proper circuit to be actuated and the arm 44 will move horizontally toward the conveyor 20b to intersect the path of travel described by the empty hanger 22 so the hook may be hung on the empty hanger detected by the switch 48.

When the hook is transferred from the arm 44 to the empty hanger 22, the cylinder 46 lowers the arm 44 so that lug 32 is received in the spherical socket 30 of the hanger 22. The transfer mechanism 50 operates in the same manner as the transfer mechanism 42 and moves the part hooks 26 from the conveyor 20b to the conveyor 20a.

The transfer mechanisms 42 and 50, which move the part hooks 26 from one conveyor to another, comprises a horizontally movable arm position 52 which is suitably driven through the arm 54 by the electric motor 56 whose circuit is properly closed when switches 38 and 48 are actuated. The rotation of the motor 56 is transmitted through the belt 58 and suitable gears 60 to cause arm 52 to move horizontally. The arm 44 also turns when arm 52 is moved. This is accomplished by the link 62 which is connected to the support 64 whereon the other parts of the mechanism are supported so that as the arm 52 is oscillated, likewise the arm 44 will be oscillated and its rate of movement is coordinated so it will be in the proper position to intersect the path of the part hooks 26 at the proper instant.

In FIGURE 2 of the drawings, a modified form of the transfer mechanism as shown in FIGURE 1 is illustrated wherein the numeral 20a designates a storage conveyor which moves in the direction of arrow 66. FIGURE 2 also shows a dispatch conveyor 20b which continuously moves in the direction of arrow 68 and a work conveyor 20c which may be moved in either direction as indicated by arrow 70. Each of the conveyors include the I-beam 20, the chains 24, and the parts hangers 22 which travel on the I-beam 20 with rolling engagement and which are continuously driven by chain 24. The hangers 22 have the spherical sockets 30 wherein part hooks 26 are received. The transfer mechanism shown in the top portion of the drawing is arranged so that it may move the part hooks 26 between the conveyor 20a and the conveyor 20b regardless of the horizontal distance therebetween.

*Horizontal transfer mechanism*

Th transfer mechanism 72 shown in the top portion of FIGURE 2 which transfers the part hooks 26 between conveyors 20a and 20b, is illustrated in more detail in FIGURES 3 through 8 of the drawings. This mechanism 72 includes a pair of spaced rails 74 which may be supported by the I-beams 20 of the conveyors 20a and 20b or on the roof trusses of the building wherein the conveyor is installed. It is manifest that rails 74 may be of any desired length and, hence, can cause the transfer of parts between conveyors regardless of the horizontal distance therebetween. Secured to the inner faces of the rails 74 are a pair of roller guides 76 which receive rollers 78 therebetween. The rollers 78 are secured to a carriage 88 which, in turn, supports the components of the transfer arm 80. The rollers 78 are provided so the transfer arm 80 may readily be moved horizontally between conveyor 20a and 20b. The rollers 75 which roll on guide blocks 77, see FIGURE 7, maintain horizontal alignment of the carriage 88 during its horizontal movement. This horizontal movement of the conveyor is caused by an electric motor 82 which, through a suitable drive to be hereinafter described, drives a gear 84, which engages a rack 86 secured to one of the rails 74. The motor 82 is supported by the carriage 88. Secured on one of the rails 74 are blocks 90. These blocks each have an adjustment 92 which is used to position stops 94. Vertically extending above and below the carriage 88 is a mechanism for actuating the transfer arm 80. The mechanism which extends vertically above the carriage 88 is most clearly seen in FIGURE 7 and includes a portion of the carriage 88, an actuating arm 96, an air cylinder 98 and a hollow shaft 100. The shaft 100 has its upper end journalled on carriage 88 by bearing 102 and is secured to the actuating arm 96 by a pin 104 to rotate therewith. The actuating arm 96, in turn, is fastened to the piston rod 106 of the air cylinder 98 through a thrust bearing 108 so that the actuating arm 96 may rotate independently of the rod 106 and may be vertically moved by rod 106 when the air cylinder 98 is actuated.

From the above, it is apparent that the shaft 100 can be moved vertically by rod 106 and oscillated in the horizontal plane by arm 96. This arm 96 has a pin 110 on its free end that is spaced from shaft 100. This pin 110 is arranged to engage the stops 94 as the carriage 80 is moved by the electric motor 82. Thus, when the motor 82 causes the carriage 88 to move to the right toward the position as shown in FIGURE 3, the pin 110 will move from its engagement with the stop 94 as located on the left of the machine and, when the carriage is moved a sufficient distance, the pin 110 will engage the stop 94 as located on the right of the apparatus. This will cause the actuating arm 96 to be pivoted a distance as predetermined by the stops 112 which are formed around an opening in a part 114, see FIGURE 6.

Vertically located beneath the carriage 88 is a mechanism which is shown in FIGURE 7a. This mechanism includes the shaft 100 which has its lower end journalled on the carriage 88 by a second bearing 116 which is vertically spaced below bearing 102. Secured by means of a pin 118 on the bottom end of shaft 100 is a collar 120. This collar 120 vertically supports the transfer arm 80 and imparts the rotation of shaft 100 to arm 80 through the shear pin 122 which protects the various parts of the apparatus from damage in the event that the horizontal oscillation of the arm 80 may be prevented for some cause. Disposed above the arm 80 is a second annular collar 124 which is also suitably secured to shaft 100 by pin 126. The collars 120 and 124 vertically maintain arm 80 on shaft 100.

The arm 80, see FIGURES 6 and 7a, is formed with a bifurcated end 121 which has a semi-spherical depression 123 therein so that it may receive the lug 34 on the part hook 26.

In FIGURE 8, the means for horizontally moving the carriage 88 relative to rail 74 is shown. This means preferably includes a friction clutch 126 which will limit the torque which causes the driving engagement between the driving gear 84 and the rack 86. This clutch prevents injury to the parts of the apparatus in event the horizontal motion is impeded for some cause.

*Vertical and horizontal transfer unit*

In FIGURES 9–13, the transfer unit is shown in greater detail than the embodiment in the lower portion of the drawing in FIGURE 2. This transfer unit may be carried by rails 20, i.e., the roof trusses, or other supports, and will move the work hangers 26 without regard to the vertical or horizontal distance which separates the points of transfer, i.e., conveyor 20b to conveyor 20c or conveyor 20b to a suitable work station. The transfer unit shown in FIGURES 9–13, is basically similar to the transfer unit shown in FIGURES 3–8, that is, the rail 74, the roller guides 76 and 77, the driving motor 82 which drives gear 84 on rack 86, are similar to the corresponding units as have been described previously. In the embodiment shown in FIGURES 3–8, the arm 80 was made to rotate so that its parts hook 26 receiving socket was rotated to be substantially in alignment with the parts hooks 26. When this arrangement is used, the hangers 22, in effect, move the part hooks 26 into the sockets 123 as the hangers are moved by the chain 24. In the transfer unit shown in FIGURES 9–13, the arm 166 is not oscillated and is moved in a direction so that its path vertically intersects the path of travel of hangers 22 at precisely the instant when the hangers 22 are in the proper position. This movement to transfer the part hooks is accomplished without interrupting the movement of the hangers 22 on the conveyor track.

In the embodiment in FIGURES 9–13, the horizontal movement of the mechanism is accomplished by driving the carriage 130 by motor 82 through the clutch 134 and gear 84 and rack 86. The rollers 132, 136 and guide rails 76 and 77 maintain the carriage 130 in constant horizontal and vertical alignment.

When a part hook 26 is to be removed from the hanger 22, the motor 82 causes the carriage 130 to move forward to bring the arm 166 in a position to engage the annular ring 34 on the parts hanger. At this instant, the motor 140 is actuated to either raise or lower the arm 166 as required. The rotation of motor 140 is transmitted through a suitable sprocket gear 142 and chain 144, which drives a sprocket gear 146. The sprocket 146, see FIGURE 11, through a clutch means 147, drives the shaft 148 to which a sprocket gear 150 is secured. As clearly seen in FIGURES 10 and 11, the carriage 130 is secured to a hollow shaft 152 which extends a substantial vertical distance both above and below the carriage 130. Secured to the upper end of the shaft 152 is a suitable bearing support 154 for the shaft 148 which, in turn, supports the sprockets 146 and 150 and the clutch 147. Secured to the lower end of the shaft 152 is a stop 156, see FIGURE 13. Slidable on the surface of the shaft between the stop 156 and the carriage 130 is the arm assembly which will be hereinafter described. The shaft 152 has a longitudinally extending groove 158 formed on its outer surface wherein a pin 160 moves to prevent rotation of the arm assembly on shaft 152. The arm assembly also has suitably located bearings shown at 162 which permit the arm to freely move vertically relative to the shaft 152. Interposed between a member 164 and the arm 166 whereon the socket 167, which receives the lug 34, is formed, is a shear pin 170. This pin 170 will prevent damage to the various parts of the apparatus should the movement of the arm 166 and the moving hangers 22 be improperly synchronized. A weight 172 is movably contained within the hollow bore of the shaft 152. This weight is secured to one end of a chain 174 which extends over the periphery of the socket 150. The other end of chain 174 is secured to a hanger 176 on member 164. The weight counterbalances the weight of the arm assembly which includes the arm 166 and the member 164. From the above, it is apparent that, as the sprocket 150 is rotated by the motor 140, the arm assembly will vertically move on the hollow shaft 152 so that the parts hooks 26 which are to be removed from the moving hangers 22 may be raised or lowered to accomplish the removal of or placing the part hooks 26 on the hangers and so the part hooks may be presented at a work station or be placed on another moving conveyor at a lower level, without regard to the horizontal, or vertical, distance from the conveyor from which the part hooks 26 were originally removed. When the part hooks 26 are to be returned to the conveyor, the direction of motor 140 is reversed so that the arm assembly is raised to move the part hooks 26 into alignment with the moving hangers 22 of the conveyor. At precisely the proper instant, the motor 140 is rotated to raise and/or lower the arm assembly relative to the part hooks 26 so that the spherical ball 32 is received in the socket 30 of the part hangers 22. This is accomplished through a system of electrical controls which will be hereinafter described.

*Indexing discs*

Before proceeding further with the explanation of the conveyor transfer and selector mechanisms, the indexing means shown on FIGURES 19 and 20, which are carried on each of the part hooks 26, will now be explained. Disposed between the lug 32 and the lug 34, on the part hook 26, is a disc carrying member 200. This member is preferably cylindrical in shape, is rotatable on the part hooks 26, and is formed to have a plurality of annular grooves 202 on its external surface which have spacers 204 therein. Adjacent to each of these grooves 202 is a radially disposed bore 206 wherein a detent ball 208 and a spring 210 are received. The grooves 202 and spacers 204 are arranged to each locate a selector disc 212, most clearly shown in FIGURES 17 and 18. Each of the discs 212 have two oppositely extending lugs 214a and 214b. The discs 212 are rotatable on member 200 and because of their irregularly shaped central opening 218 are resiliently held in any one of four positions by the ball 208. This ball 208 is held in tight engagement with four notches 216 in the disc which are formed as shown on FIGURE 17 on the central opening 218 of the discs 212. The member 200 has its upper end formed as shown in FIGURE 20 to have two oppositely extending lugs 20. These lugs 220 are used to actuate an initiate switch which will be hereinafter described.

As clearly apparent in FIGURES 17 and 18, the discs 212 are individually rotatable on the member 200 to provide a plurality of different indexing settings when lugs 214 on some of the discs 212 are turned to be at right angles to lugs 214 on other discs 212. This arrangement will permit the proper identification of the parts which are present on the parts hook 26.

*Disc setting head*

In FIGURES 14 and 15, a mechanism for setting, or positioning, the discs 212 on member 200 is shown. While this mechanism can be installed in any of the transfer arms shown in the drawings, it is particularly adapted to be carried on the transfer arm 166 in the apparatus as shown in FIGURES 9–13. The mechanism includes an electric motor 221, a clutch 222, a solenoid 224 which moves a plunger 226, a switch 228 which is actuated by the solenoid plunger 226 through arm 230. The member 232, which forms the driven element or disc of clutch 222, has a notch 234 on its outer periphery. The member 232 is connected with and drives the driving gear 237 which rotates a pair of idler gears 238, and a segmented gear 240 which has a pair of depending lugs 242 secured thereon. The apparatus also includes a switch 244 which is actuated by a suitably located lug 235 on clutch part 236 and also includes a support 246. The function of switch 244 will be later described. The support 246 has a bifurcated end 248 which is provided with a suitable socket 249 to receive an annular lug 252 on the part hooks 26 which is held by spherical lug 34 and the socket on arm 166. The lug 252 serves to steady the part hook 26 while the member 200 is rotated on the part hook 26 to accomplish the setting of discs 212. The gear 240 is segmented as shown in FIGURE 14 so it may embrace and revolve about the part hook 26 during the setting of discs 212.

As clearly seen in FIGURE 15, the cam setting apparatus which is secured to the arm 166 of the transfer mechanism as shown in FIGURES 9–13 will set the discs 212 on the disc carrying member 200 in any predetermined arrangement. When a part hook 26 is in position on the bifurcated end of the arm 166 and it is desired to change the setting of the cam discs, the solenoid 224 is actuated through a suitable electrical circuit and the plunger 226 moves to the right as in FIGURE 15 and out of notch 234 in member 232. The movement of the plunger 226 to the right also causes the switch 228 to be energized. This switch 228 controls the operation of the motor 221 whose rotation is transmitted through clutch 222 to the gear 237. When the gear 237 rotates, it drives the idler gears 238 to cause the segmented gear 240 to rotate. The rotation of the segmented gear 240 is imparted to member 200 through lugs 242 on the gear and the lugs 250 which are located on the disc carrying member 200 so the entire disc carrying member 200 and the discs 212 thereon are caused to rotate. Secured in suitable positions on the mechanism are a pair of metal cards 251 and 253. These cards 251 and 253 are each provided with a plurality of pre-arranged notches 254 and teeth 256 which are adapted to engage the lugs 214a and 214b on the discs 212 as the discs 212 are rotated. In FIGURE 17, the arrangement for removably securing the cards 251 and 253 in the mechanism is shown.

Indexing cards

From the above, the notches 254 on the cards 251 and 253 may be formed when the teeth 256 are removed. This arrangement, when used, for example, with ten discs 212 on member 200 will provide for 1056 different combinations of disc 212 settings. The setting of the lugs 214 relative to member 200 is accomplished as follows. In FIGURE 17 one of the cards, i.e., 251, is provided with a notch 254 and the other card 253 has a tooth 256 thereon. Thus, it is apparent that as the segmented gear 240 completes one counter-clockwise revolution of 360°, the lug 214a on the disc 212 will first pass through the notch 254 on the card 251 and will be rotated 90° until the lug 214b on the same disc 212 engages the tooth 256 on the metal card 253. From the above, it is apparent that when the present arrangement is used, any setting which may have been present on the discs 212 will be wiped out by one or the other of the cards 251 or 253 so that a new setting, to indicate that the parts carried on the part hook are different from those which were previously held, will be formed. This arrangement is particularly useful if it is assumed that a part is to be operated upon at a work station. Thus, the selector discs 212 will initially cause the part hook 26 to be transferred to the particular work station by the apparatus according to the present invention which will also be further described. After the necessary operations have been performed on the transferred parts held on the part hook 26, the mechanism shown in FIGURES 14 and 15 will reset the discs 212 to indicate that the work has been completed on the part before the part hook 26 is returned to the conveyor system. It is clearly apparent from the drawings that the metal cards are, in effect, mere images of one another, that is, if a notch is present on one of the cards a corresponding tooth will be located on the other card so that the proper setting of the selector discs will result. These cards are preformed to have the desired arrangement of teeth and notches by knocking out certain teeth to form notches so that the discs will indicate the status of the part on the part hook.

Sensing head

In FIGURES 21 and 22, the switches and mountings therefor for sensing the locations of the lugs 214 on the selector discs 212 are shown. This sensing switch arrangement includes a plurality of switches 260 which are suitably secured on a support 262 which is mounted adjacent the path of travel of the part hooks 26. The sensing switch arrangement includes suitable guides 264, 266, 268 and 270 which, because of their location relative to lugs 250 and disc 252 guide the part hook 26 so the disc carrying member 200 and the lugs 214 will be properly positioned relative to the switches 260. Each of the switches is provided with an actuating arm 272 which is preferably formed as shown to have an arm portion and a land 274 which is engaged by the lugs 214. The top switch 260a has an arm 276 which is arranged to be engaged by the lug 220 on the cam carrying member 200. This is the initiate switch and is formed without a land so the switch opening and closing action will occur with a rapid action. The remainder of the switches 260 have the lands 274 which engage the lugs over a considerable portion of their travel so that the switch will be maintained closed for an appreciable length of time. These switches are included in an electrical circuit which will be hereinafter described.

Sensing and position drum

In FIGURES 23 and 24, the category selecting drum mechanism is shown. This mechanism includes a pair of drums 300 and 302, mounted on a common shaft 304 that is driven at a constant speed at a predetermined rate of rotation by the electric motor 306, which is coupled to the shaft 304 by a flexible coupling 308. Each of the drums 300 and 302 are provided with a plurality of radially extending slots 310 which are most clearly seen in FIGURE 24. In each of these slots a metal card 312 is installed which is similar to the metal cards 251 and 253 which were placed in the cam setting mechanism. The cards 312 also have notches and teeth which are arranged to indicate one of a plurality of combinations. The drum 300 is the selector drum which indicates what part is desired to be transferred and the drum 302 is the position drum which indicates in what position the particular card on drum 300 is located. FIGURE 24 is a cross-sectional view showing the arrangement of switches 314 and 316 on the selector drum 300. These switches are actuated through arms 318 and 320, respectively, by the lugs which are present on the cards 312 so that, for each revolution, the switches 314 and 316 will be closed when the proper tooth on the cards 312 engages the arms 318 and 320 to cause the switches 314 and 316 to be closed. The parts and functions including the switches on the position drum 302 are the same as described for the selector drum 300. The position drum 302 and parts therefor are used to maintain an inventory as will become apparent when the electrical hook-up of the entire system is explained. It is to be noted that both the selector drum 300 and the position drum 302 both have two switches 314 and 316. The arrangement avoids a duplication of parts. One of the switches, i.e., 314 on the selector drum and the corresponding switch 314 on the position drum are arranged to control one of the transfer arms which moves the hooks 26 in one direction. The other set of switches 316 on the selector and position drum are used to control circuits which are associated with the other transfer arm mechanism which moves the parts hooks 26 in a direction opposite to the direction of transfer of the first mentioned transfer arm.

Electrical circuits

In the explanation of the drawings in FIGURES 25 through 30, it is to be remembered that the broad purpose of the various elements which make up the control circuits is to control two transfer arms which cause the transfer of the part hooks 26 between the conveyors. Another purpose of the control circuits is to maintain a predetermined inventory of parts on at least one of the conveyors, if this latter feature is desired.

The transfer of parts hooks 26 will occur only when; the switches 260 as located on the sensing head shown in FIGURES 21 and 22 as closed by the proper setting of the lugs 214 on the part hooks 26, the switches 314 or 316 on the selector drum 300, as determined by the cards 312 and the switches 314 or 316 in the position drum 302 shown in FIGURES 23 and 24 are in proper agreement. When all of these switches agree with one another, the proper relays will close the necessary circuits to cause the transfer of selected part hooks 26 by one of the two transfer arms to occur. Further, it is to be appreciated that the circuits which will be hereinafter set forth are all interrelated and while they are described as separate circuits their interrelation should constantly be kept in mind.

In the electrical circuit to be described, the relay operated contacts are shown either normally open or normally closed with the direction of the arrow through the contact indicating the force applied to the contact by the magnetic force of a relay coil when it is energized. As an example of this, reference is made to FIG. 28 wherein the contact R9–2 is a normally open contact which is closed when relay coil R9/2 is energized. The arrow indicates the direction of force applied to the contact when the relay coil is energized. In FIG. 28 relay operated contact R6–4 is a normally closed contact, the arrow indicating that this contact will open when relay coil R6/5 is energized.

Subtract circuit

The circuit shown in FIGURE 25 will be called the subtract circuit to distinguish this circuit from the add circuit which is shown in FIGURE 27. In both of these circuits, the number of switches, relays, etc., have been reduced so that the position of only two of the ten discs 212 on part hooks 26 will be detected. This simplification considerably reduces the number of electrical components in the drawings without detracting from the understanding of how the ten category system rather than the two category system, which will be hereinafter described, will operate.

In FIGURE 25, switch SW12 is a line control switch used to connect and disconnect the parts of the circuit, which will be later described, from a source of current S.

The switch PB1A is a switch which closes a circuit to the motor 306 which rotates the sensing drum 300 and the position drum 302 shown in FIGURES 23 and 24. The motor 306 is connected to a common return lead G.

The switch LS29, which is connected in circuit with switch PB1A as shown, is a reset switch and is located similar to switch 48 in FIGURE 1 to be actuated whenever a hanger passes switch LS29. Thus, each time a hanger passes, the switch LS29 will be opened and the entire system, to be later described, will be momentarily deenergized. The switch LS31 which is connected relative to switch LS29 as shown is closed only when the transfer mechanism is in a home position. That is, when the transfer arm to be actuated is in a position midway between the conveyors wherebetween the transfer of a parts hook is to occur. The switch LS31 is connected through a suitable lead to a junction 400. Connected to the junction 400 through suitable leads as shown are the switches S1, S2, S3, and S4 and contacts R19–1, R20–1, R21–1, and R22–1. The switches S1, S2, S3, and S4 are all located and shown as switches 260 in the sensing head as shown in FIGURE 21. Switch S1 corresponds to the initiate switch 260a which is closed by lug 200 on member 200 while the remainder of the switches S2, S3 and S4 are closed by the lugs 214 on the discs 212. The contacts R19–1 through R22–1 are normally open and are closed when relays R19/3 through R22/2 are energized. The numeral following the diagonal line indicates the number of contacts controlled by a relay coil. From the above arrangement, it is apparent that the closure of any of the switches S2 through S4 with the closure of switch S1 will result in the energization of at least one of the corresponding relays R19/3 through R22/2, i.e., when a hook 26 passes the sensing head, the initiate switch S1 will be closed and, if the lug 212 is in the proper position to close switch S2, then relay R19/3 will be energized to cause contacts R19–1 to close. The closure of contacts R19–1 will form a holding circuit for relay R19/3 and maintain the relay R19/3 energized even during periods when switches S1 or S2 are open.

The switches S5, S6 and S7 are connected as shown to junction 400 and correspond to switches 314 or 316 on the sensing drum 300 and are closed when the drum 300 rotates and the proper card 312 is in a position to close the switches. The switches S9, S10 and S11 correspond to switches 314 or 316 on the position drum and are located relative to drum 302 to be closed when the card 312 on the position drum 302 is rotated to proper position. The switches S12, S13 and S14 are manual switches circuited as shown and are normally held in the positions indicated in the drawing. The function of these switches will be later described. The switch S5 is an initiate switch and all the cards 312 of the position sensing drum are arranged to close this switch each time the card is in a position to close any other of the switches S6 through S7. The switches S6 through S7 are connected in circuits as shown in the drawings which circuits are further controlled by the contacts of the relays R19/3 through R21/2. Thus, assuming again that the switch S2 has been closed by the proper lug 212 on the parts hooks 26 and that the sensing drum 300 has caused switch S6 to be moved from the position shown in FIGURE 25 to close the circuit to contacts R19–2. Then this circuit will be complete through switch S7 and closed contacts R20–3. In this connection, it is to be noted that when contacts R19–2 are closed, contacts R19–3 will be open. This fact is also true of contacts R20–2 and R20–3 and R21–2, and throughout the explanations of the circuits which follow. Thus, when relay R20/3 is energized, a plurality of contacts will move to open and/or close certain circuits. These contacts, when actuated by any relay, will have a suffix number which follows the relay number to indicate that the contact is moved when the relay is actuated, i.e., relay R20/3 closes contacts R20–1, R20–2 and opens contacts R20–3. Thus, if only the switches S5 and S6 are closed and the relay R19/3 is energized, the circuit will be complete to lead 402. The switch S4 is used to indicate the presence of an empty parts hook 26 to cause the transfer of empty hooks through the system at all times. When switch S4 is closed, relay R21/2 will be energized. This will cause contacts R21–2 to close. This arrangement will cause lead 401 to be energized and lead 402 to be deenergized, the purpose of which will be hereinafter set forth. When lead 401 is energized and the switches S12 through S14 are in the position indicated, the switches S9 through S11 will be closed by the cards on the position drum 302 to indicate that the cards which have closed switches S5 through S7 are in the proper position so that the proper relay R23S/3 through R26S/3 will be energized. When relay R23S/3 is energized, it actuates and closes contacts R23S–1 to form a holding circuit for relay R23S/3 and relay R23S/3 will remain closed irrespective of the opening or closing of switches S1 through S7 and switches S9 through S14. The relay R23S/3 will actuate the subtract side of one of the add and subtract relays which are shown in FIGURE 29 and cause the contacts R23S–3 to close. Similarly, when relays R24S/3 and R25S/3 are energized by the closure of the proper switches S10 and S11, then the contacts R24S–3 and R25–3 will close. The relay R26S/3 is connected to be energized whenever any of the switches S12, S13 and S14 are moved from the position indicated and any of the switches S9, S10, S11 are closed and lead 402 is energized. The relay R26S/3 will establish its holding circuit through contacts R26S–1 and does not have an add circuit connected to its add and subtract relay arrangement, as will be hereinafter described. This arrangement will permit all of the hooks 26 on one conveyor to be transferred from one conveyor to another without upsetting the balance of an add and subtract relay for any particular category of parts. Thus, as will become apparent, if the add and substract relay is balanced for any particular category, then the switches S12, S13 and S14 and relay R26S can be used to control the actuation of one of the transfer arms to move all the parts hooks 26 out of one conveyor without having the add relay circuit cause the other transfer arm associated therewith to hunt for a hook 26 to replace the hook 26 which was transferred by the transfer arm associated with the subtract circuit. Relay R26S/3 closes contacts R26S–3 to energize relay R22/2 so the transfer of parts will occur.

The switches PB2B and PB2C which are interconnected with each other and with switch PB2A are inventory switches, the purpose of which will be hereinafter set forth. The switch PB1B and switch PB1A are interconnected as shown in the drawings, also are inventory switches and are normally opened or closed as shown in the drawing. When any of the contacts R23S–3 through R26S–3 are closed, the circuit will be complete to energize relay R22/2 so that contacts R22–1 close to form a holding circuit for the relay R22/2. When relay R22/2 is energized, it will close the contacts R2–2 shown in FIGURE 26 so that the movement of the transfer arm will occur as will be hereinafter described.

The transfer arms are adapted to be energized by the circuit shown in FIGURE 26, that is, one of the transfer arms will be moved whenever motor M1 is energized and the other transfer arm will be moved when electric motor M2 is energized. The motors selected are three phase reversible types as are well known and are individually shown as electric motor 82 in FIGURE 10. The motors are energized when the line switch SW1 is closed and the proper relay R1 or R2, in the case of motor M1, and the relays R6 or R7, in the case of motor M2, is energized. The line current through switch SW1 is transformed by suitably wound transformer T1 to energize through the secondary winding of the transformer T1S. The secondary winding T1S is connected in a circuit which will be hereinafter described to close a circuit between leads 1 and 2 so that the proper relays R1, R2 for the subtract circuit transfer arm will be energized at the proper instant.

The switches shown in the drawings are normally disposed in the positions indicated in FIGURE 26 and are suitably located on the transfer apparatus so that the opening and closing thereof will correspond to the following description. The switch LS5 is operated when the carriage is in the extreme forward position. The switch LS1 opens when the carriage is moved forward from the center position. The switch LS2 is located to be closed whenever a parts hook 26 is present on a hanger in a predetermined position relative to the transfer apparatus. Thus, when switch LS5 and the switch LS1 are in the positions shown and switch LS2 is closed by a parts hook and the contacts R22–2 have been closed through the circuit heretofore described, relay R3/2 will be energized. When relay R3/2 is energized, contacts R3–1 close to form a holding circuit for the relay R3/2 regardless of the subsequent positions of switches LS1 and LS2. The relay R3/2, when energized, will also cause contacts R3–2 to close to complete a circuit through the normally closed contacts R2–1 to energize relay R1. When relay R1/5 is energized, contacts R1–1 close to energize motor M1 and to start the carriage in its forward movement. When the carriage begins its forward motion, switch LS1 is moved from the position shown to close a circuit through the normally open contacts R1–3 and the normally closed contacts R2–1. Relay R1/5, because of the previous closure of contacts R3–2 has caused the relay R1/5 to close contacts R1–3 so that the holding circuit for relay R1/5 is now established through the now closed contacts R1–3 and R2–1 which causes the carriage to continue in its forward motion to the most forward position of its travel. When the carriage is in its most forward position, switch LS5 is moved from the position shown to close a circuit to lead 403. Switch LS6 is located to be responsive to the forward position of the carriage and closes a circuit when the carriage is in the forward position to actuate the lift mechanism through a switch SVA3 which, in the embodiment in FIGURE 10, is electric motor 140, and in the embodiment in FIGURE 7, is the air cylinder 98. When switch SVA3 closes, the part hook 26 is raised by the transfer arm from the hanger in the conveyor. After the raising of the part hook 26 is completed as when the air cylinder is in its raised position, switch LS7 closes a circuit between lead 403 and relay R2/4 through the normally closed contacts R1–4 of relay R1/5. When relay R2/4 is energized, contacts R2–1 close to complete a holding circuit through switches LS11 and LS8. The relay R2/4 causes contacts R2–2 to close so that the motor M1 causes the carriage 88 to move in the reverse toward its central position where switch LS8 opens from the position shown to close a circuit to lead 404. When the carriage is in the center position, its movement will be interrupted until switches LS9 and LS10 are both closed to energize relay R4/2. The switch LS9 is opened by a parts hook and the switch LS10 is closed by a hanger. Thus, the circuit to R4/2 will not be complete until an empty hanger is present in the proper position on the conveyor system so that the transfer arm may transfer the part hanger held thereon onto the empty hanger detected by switch LS10. When relay R4/2 is energized, it causes contacts R4–1 and R4–2 to close. Switch LS11 still remains closed as the carriage has not reached its furthest reverse position so that the circuit is complete through the switch LS11 and the closed contacts of switch R4–1 to the reverse relay R2/4. The contacts R4–2, during this time, have been closed and the holding circuit to relay R4/2 remains energized as long as switch LS11 is in the proper position. When the carriage has reached its furthest reverse position, switch LS11 is moved to close a circuit with lead 405. Lead 405 is connected through a switch LS12 with a suitable device SVA4 which causes the air cylinder, or electric motor, to lower the transfer arm to place the parts hook 26 on the hanger detected by switch LS10. Simultaneously, with the closure of switch LS12, switch LS13, which is connected to lead 405, closes. This completes a circuit to the relay R1/5 to start the carriage from its furthest reverse position toward the center position. The energization of relay R1/5, at this time, also causes the contacts R1–3 to close so that the forward motion of the carriage is continued until the carriage moves to its central or neutral position which completes the circuit through contacts R1–3 to the position where it completes a circuit to the now open contacts R22–2 so that the above cycle may be repeated.

It is to be noted that contacts R1–4 associated with relay R1/5 and contacts R2–1 associated with relay R2 are normally closed. These contacts R1–4 and R2–1 open when the relay associated therewith is energized so that the reverse R2 and forward R1 relays cannot be simultaneously energized.

*Add circuit*

The circuit shown in FIGURE 27 will be called the add circuit to distinguish this circuit from the subtract circuit which is shown in FIGURE 25. In FIGURE 27, the switches LS29 and LS31 have been described previously, and, when closed, will supply current energy to junction 400. The switches S1A, S2A, S3A and S4A may be identical to the switches S1 through S4 as described in FIGURE 25. If desired, the switches S5A through S7A and S9A through S11A are the other set of switches 314 and 316 on drums 300 and 302. The switch S1A is the initiate switch and the switch S4A is used to detect the presence of an empty hook 26. When the switch S1A and any one of the switches S2A, S3A or S4A are closer, one or more of the relays R27/3 through R29/2 will be energized to close the proper contacts R27–1 through R29–1 to form a holding circuit to maintain the relays R27/3 through R29/2 closed even though the switches S1A through S4A may be subsequently opened.

The switches S5A, S6A and S7A are located on the selecting drum 300 and are arranged as has been described in the embodiment shown in FIGURE 25 to supply current to lead 410 when the relays R27/3 through R29/2 have caused the proper contacts R27–2, R27–3, R28–2, R28–3 and R29–3 to be opened or closed as required to complete a circuit between the junction 400 and the lead 410.

The switches S9A, S10A and S11A are located on the position drum 302 and are normally closed in the position indicated. When these switches are closed by the tooth on the card in the position drum, a circuit will be complete to the contacts R23B, R24B and/or R25B of the add and subtract relay which will be hereinafter described. In the event that these contacts of the add and subtract relay are closed, a circuit will be complete from lead 410 through the normally closed contacts of the contacts R23S–2, R24S–2 and R25S–2 to certain of the relays R23A/2, R24A/2 and R25A/2, respectively. These relays are a part of the add and subtract relay which will be hereinafter described and will cause certain of the contacts R23A–2, R24A–2 and R25A–2 to close to complete a circuit between the junction 400 and the energizing coil of relay R30/2 which, in turn, causes contacts R30–1 to close and form a holding circuit to maintain relay R30/2 energized until switches LS29 and LS31 are opened.

The circuit for energizing the motor M2 in FIGURE 26 is shown in FIGURE 28. This circuit may be connected to leads 1 and 2 of the circuit shown in FIGURE 26 and will cause the second transfer arm to move the parts hook in the opposite direction to the direction of movement of the parts hooks 26 which was caused by the transfer arm which was associated with motor M1. This arrangement will cause the return of the parts hooks to the conveyor from which the transfer mechanism associated with the subtract circuit or motor M1 has removed the parts hooks.

The switches shown in the drawings are normally disposed in the positions indicated in FIGURE 28 and are suitably located on the transfer apparatus so that the opening and closing thereof will correspond to the following description. The switch LS19 is operated when the carriage is in the extreme forward position. The switch LS15 opens when the carriage is moved forward from the center position. The switch LS17 is located to be closed whenever a parts hook 26 to be transferred is present on a hanger in a predetermined position relative to the transfer apparatus. Thus, when switches LS19 and LS15 are in the position shown and switch LS17 is closed by a parts hook 26 and the contacts R30–3 have been closed through the add circuit heretofore described, relay R8 will be energized. When relay R8/2 is energized, contacts R8–1 are closed to form a holding circuit for the relay R8/2 regardless of the position of switches LS15 and LS17. The relay R8/2, when energized, also will cause the contacts R8–2 to close to complete a circuit through the normally closed contacts R7–4 to energize relay R6/5. When relay R6/5 is energized, the contacts R6–1 close to energize motor M2 and start the carriage in its forward movement. When the carriage begins its forward motion, switch LS15 is moved from the position shown to close a circuit through the normally open but now closed contacts R6–3 and the normally closed contacts R7–4. Relay R6/5, however, because of the closure of contacts R8–2, has previously caused the contacts R6–3 to be closed so that the holding circuit for the relay R6/5 is established through the now closed contacts R6–3 and R7–4 which causes the carriage to continue in its forward motion to the most forward position of its travel. When the carriage is in its most forward position, switch LS19 is moved from the position shown to close a circuit to lead 411. Switch LS20 is located to be responsive to the forward position of the carriage and closes a circuit when the carriage is in the forward position to actuate a lift mechanism through a switch SVA1 which controls the lift mechanism as in the embodiment in FIGURE 10 is electric motor 140 and in the embodiment in FIGURE 7 is the air cylinder 98. When the switch SVA1 closes, the part hook 26 is raised by the transfer arm from the hanger on the conveyor. As the raising of the parts hook 26 is completed as when the air cylinder 98 is in its raised position, switch LS21 closes a circuit between lead 411 and relay R7 through the normally closed contacts R6–4 of relay R6/5. When relay R7/5 is energized, contacts R7–1 close to complete a circuit through switches LS25 and LS22. The relay R7/5 causes contacts R7–2 to remain closed so the motor M2 continues the movement of carriage 88 in the reverse direction toward its central position where switch LS22 moves from the position indicated to close a circuit to lead 412. When the carriage is in the center position, its movement will be interrupted until switches LS23 and LS24 are both closed to energize relay R9. The switch LS23 is opened by a parts hook and the switch LS24 is closed by a hanger. Thus, the circuit to R9/2 will not be complete until an empty hanger is present in the proper position on the conveyor system so that the transfer arm may transfer the part hook held thereon onto the empty hanger detected by switch LS 24. When relay R9/2 is energized, it causes contacts R9–1 and R9–2 to be closed. Switch LS25 stil remains closed as the carriage has not reached its furthest reverse position so that a circuit is complete through switch LS25 and the closed contacts R9–1 and R6–4 to reverse relay R7/5. The contacts R9–2 during this time close a holding circuit to relay R9/2 so that this relay will remain energized as long as switch LS25 is in the proper position. When the carriage has reached its furthest reverse position, switch LS25 is moved to close a circuit with lead 413. Lead 413 is connected through a switch LS26 with a suitable switch SVA2 which causes the air cylinder or electric motor, to lower the transfer arm to place the parts hook 26 on the hanger detected by switch LS24. Simultaneously, with the closure of switch LS26, switch LS27, which is connected to lead 413, closes. This switch LS27 completes a circuit to relay R6/5 to start the carriage from its furthest reverse position towards the center position. The energization of relay R6/5, at this time, also causes the contacts R6–3 to close so that the forward motion of the carriage is continued until the carriage moves to its central or neutral position where switch LS15 is caused to move from the position which completes the circuit through the contacts R6–3 to the position where it completes a circuit to contacts R30–3 so that the above cycle may be repeated. It is to be noted that the contacts R6–4 associated with relay R6/5 and contacts R7–4 associated with relay R7/5 are normally closed and open when the relay associated therewith is energized so that the forward relay R6 and reverse relay R7/5 cannot be simultaneously energized.

The add and subtract relay shown in FIGURES 29 and 30 of the drawings is arranged to maintain a predetermined number of parts hooks 26 on the conveyors. This relay has leads shown in the encircled numerals 1 through 12 in FIGURE 29 which are connected to the corresponding leads of the encircled numerals 1 through 12 in FIGURES 25 and 27. The subtract relay coil R23S and the add relay coil R23A are hooked into a circuit as shown in FIGURE 29. Each time the subtract relay is energized through leads 5 and 8, a ratchet arrangement causes a disc 420 to be moved one notch 421 in one direction. Whenever the add relay coil is energized, the disc 420 is rotated in the opposite direction. The disc 420 itself, in the add and subtract relay as utilized in the present circuit, has 27 notches 421 so that up to 27 parts hangers may be transferred by the subtract relay if, for some reason, the add relay did not cause the transfer of parts. Located on the disc 420 is a raised lug 422 which will cause a pair of contacts 423 and 424 to open when the disc 420 is at a predetermined position or is in balance. In the circuits shown in FIGURES 25 and 26, a plurality of add and subtract relays are used which have contacts and leads which are connected as R23B in FIGURE 29 and contacts R23B, R24B and R25B in FIGURE 27. These contacts are all connected between leads indicated as 9 and 10 in each of the figures. It is to be noted when contacts R23B through R25B are open, none of the relays from R23A through R25A can be energized so that the transfer of parts as initiated by the add circuit will not occur as long as the add and subtract relay is in balance. The remainder of the contacts, i.e., R23A–2, R23S–2, R23A–1, R23A–3, R23S–1 and R23S–3 are connected to the respective leads as shown in FIGURES 29, 25 and 27 to accomplish the proper closing of the circuits as has heretofore been set forth.

If it is desired, subtract coils R23S through R25S of the respective add and subtract relays may be unbalanced without causing the transfer of parts through the subtract circuit. This is accomplished by opening switch PB1A in FIGURE 25 to stop the drum motor 306. The switch SW11, which is called the inventory switch, is then moved from the off position to any one of the three contacts which are connected to leads 8 and the respective relays R23S, R24S and R25S. It is to be noted that when switch PB1A is opened, switch PB1B is closed and when switch PB2A is depressed, switch PB2B will be opened to break the circuit to relay R22/2. Thus, each time the switch PB2A is depressed, the proper subtract relays R23S/3 through R25S/3 will be energized to cause the disc of the corresponding add and subtract relay, shown in FIGURE 30, to rotate and to move the lug 422 so that the proper contacts R23B through R25B will remain closed for a predetermined number of transfers as caused by the add circuit. Thus, the parts on one conveyor may be completely transferred between the conveyors in the reverse direction from that which was caused when switches S12 through S14 were closed as has heretofore been set forth. The add and subtract relay per se forms no part of the present invention and is herein described merely to facilitate the further understanding of the present invention.

While the embodiments of the present invention as herein disclosed constitute preferred forms, it is to be understood that other forms might be adopted.

What is claimed is as follows:

1. A conveyor apparatus, comprising; a monorail trackway arranged to form a closed path, a plurality of hangers carried by said trackway and movable along said trackway, means connected to each of the hangers for continuously moving said hangers along said trackway, a plurality of part supporting means, means on each of said hangers for suspending one of said part supporting means, transfer means including an oscillatable arm pivotally movable independently relative to the hangers and said hanger moving means for selectively removing and placing part supporting means on said hangers, an electric circuit for controlling said transfer means, and a means including a plurality of movable discs having switch actuating projections rotatably carried by said part supporting means and arranged for selectively actuating switches connected in circuit with said electrical circuit for removing and placing the part supporting means on said hangers, said discs being rotatably movable relative to each other to provide a predetermined selectivity of parts transfer.

2. A conveyor apparatus, comprising; a monorail trackway arranged to form a closed path, a second monorail trackway defining a second closed path spaced from the path of said first trackway, a plurality of hangers carried by and movable on each of said trackways, means interconnecting the hangers on each of the trackways for continuously moving said hangers on each of said trackways, a plurality of part supporting means removable from and adapted to be suspended from said hangers, transfer means including an oscillatable arm pivotally movable independently relative to the hangers and said hanger moving means for selectively removing and placing said part supporting means on said hangers and for moving said part supporting means between the hangers on said trackways, an electrical circuit for controlling said transfer means, and means including a plurality of discs rotatably movably carried by each part supporting means and arranged for selectively actuating switches connected in circuit with said electrical circuit for placing and removing said part supporting means on and from said hanger in response to the rotative position of the discs on the part supporting means, said discs being rotatably movable relative to each other to provide a predetermined selectivity of parts transfer.

3. A conveyor apparatus, comprising; a monorail trackway arranged to form a closed path, a plurality of hangers carried by said trackway and movable along said trackway, means connected to each of the hangers for continuously moving said hangers along said trackway, a plurality of part supporting means, means on each of said hangers for suspending one of said part supporting means, transfer means including an oscillatable arm pivotally movable independently relative to the hangers and said hanger moving means for selectively removing and placing said part supporting means on said hangers, and a means carried by said part supporting means for selectively actuating the means for removing and placing the part supporting means on said hangers.

4. A conveyor apparatus, comprising; a monorail trackway arranged to form a closed path, a second monorail trackway defining a second closed path spaced from the path of said first trackway, a plurality of hangers carried by and movable on each of said trackways, means interconnecting the hangers on each trackway for continuously moving said hangers on each of said trackways, a plurality of part supporting means removable from and adapted to be suspended from said hangers, means including an oscillatable arm pivotally movable independently relative to the hangers and said hanger moving means for selectively removing and placing said part supporting means on said hangers and for moving said part supporting means between the hangers on said trackways, and means carried by each part supporting means for selectively actuating the means for placing and removing said part supporting means on and from said hangers.

5. A conveyor apparatus, comprising; a trackway arranged to form a closed path, a second monorail trackway defining a second closed path horizontally spaced from said first trackway, hangers spaced on each of said trackways, means interconnecting the hangers on each of the trackways for moving said hangers continuously along said trackways, part hooks removable from and adapted to be suspended from said hangers and to be moved thereby along said trackways, means including an oscillatable arm pivotally movable independently relative to the hangers and said hanger moving means for selectively horizontally moving said part hooks from the hangers on one trackway to the hangers on the other trackway, means carried by said part hooks for selectively actuating said means for moving said part hooks, and a means engageable with the part hooks when the part hooks are carried by hangers for sensing the absence and presence of a part hook on a hanger for causing said means to remove and place a part hook on said hangers.

6. A conveyor apparatus, comprising; a trackway arranged to form a closed path, a second monorail trackway defining a second closed path having at least a portion thereof vertically and horizontally spaced from the path of said first trackway, means connected with the hangers on each trackway for continuously moving said hangers along said trackways, part hooks removable from and suspendable on said hangers and adapted to be moved by said hangers along said trackways, means including an oscillatable arm pivotally movable independently relative to the hangers and said hanger moving means for horizontally and vertically moving said hooks between the hangers on said trackways and for selectively removing or placing said hooks on said hangers, means carried by said part hooks and arranged for selectively actuating switches connected in circuit with said means for moving said part hooks, and a means engageable with the part hooks when the part hooks are carried on the hangers for sensing the absence and presence of a part hook or a hanger for causing said means to selectively remove and place a part hook on said hangers.

7. In a conveyor system, the combination comprising; a monorail trackway arranged to form a closed path, a second monorail trackway defining a second closed path horizontally spaced from the path of said first trackway, a plurality of hangers carried by and movable along said trackways, means for continuously moving said hangers along said trackways, vertically extending part hooks removable from and adapted to be suspended from said hangers, transfer means including an oscillatable arm pivotally movable independently relative to the hangers and said hanger moving means for suspending said part hooks when said hooks are removed by said means from the hangers on one trackway and placed by said means on the hangers on the other trackway, and an index means carried by said hooks for selectively actuating said transfer means.

8. In a conveyor system having; a monorail storage conveyor with hangers supported by said conveyor and spaced at intervals along said conveyor, means for continuously moving said hangers along said conveyor, a monorail dispatch conveyor spaced from said storage conveyor carrying said hangers spaced at intervals, means for continuously moving said hangers along said dispatch conveyor, vertically extending part hooks removably suspended from said hangers, first transfer means including an oscillatable arm pivotally movable independently relatively to the hangers and said hanger moving means for selectively transferring the part hooks between the hangers on the storage and dispatch conveyors, a second transfer means including an oscillatable arm pivotally movable independently relative to the hangers and said hanger moving means for selectively transferring part hooks from the hangers on one of the conveyors to different hangers on the same conveyor, and means carried by said hooks for actuating said first transfer means for causing the selective transfer of said hooks between said hangers.

9. In a conveyor system having; a monorail conveyor with hangers spaced at intervals and continuously movable along said conveyor, a second monorail conveyor spaced from said first conveyor, said second conveyor also having hangers spaced at intervals and continuously movable along said conveyor, part hooks removable from and adapted to be suspended from said hangers, transfer means including a pivotal arm for selectively transferring said part hooks only on the hangers on the first conveyor to hangers on the second conveyor, an index means carried on certain of the hooks having predetermined setting for actuating said transfer means whereby said certain part hooks only are transferred, a second transfer means including a pivotal arm for selectively transferring part hooks from the hangers on one of said conveyors to different hangers on the same conveyor, said second transfer means also being actuated by the index means on said part hooks, and means connected with said second transfer means for automatically changing the setting of said index means.

10. In a conveyor system having part hooks removable from and suspendable from hangers and a transfer means for selectively removing and placing said part hooks on said hangers, an index means carried on each of said part hooks arranged for causing said transfer means to transfer a selected group of part hooks only, said index means including; a plurality of stacked discs each having an irregular external periphery axially fixed and individually rotatable between at least two predetermined positions on said hooks, and means engaged by said index means connected with said transfer means and responsive to the relative rotative position of said discs with respect to the hook for causing said transfer means to become operative for transferring only the part hook whereon the discs are in a predetermined rotative position, and means on the hooks for rotating the hooks relative to the discs.

11. In a conveyor system, the combination comprising; a first trackway, a plurality of part hangers supported by and movable along said first trackway, a second trackway spaced from said trackway, a plurality of part hangers supported by and movable along said second trackway, part hooks supported by said hangers, a support member, means for transferring said part hooks between the part hangers that are carried by said spaced trackways, said means including a member that is movable horizontally along and supported by said support member and which is vertically reciprocable, means for moving said member horizontally along said support member, and means for vertically reciprocating said member.

12. In a conveyor system, the combination comprising; a first trackway carrying a plurality of part hangers, a second trackway spaced from said first trackway carrying a plurality of part hangers, first transfer means including a pivotal arm operable to transfer part hooks from said first trackway to said second trackway, second transfer means including a pivotal arm operable to transfer part hooks from said second trackway to said first trackway, a detecting means including means engageable by a moving part hook for operating said detecting means, master control means operable to indicate that a part hook is to be transferred between said first trackway and said second trackway, means interconnecting said detecting means, said master control means and said first transfer means for causing a part hook to be transferred by said first transfer means from said first to said second trackway when said detecting means and said master control means are operated, means interconnecting said detecting means said master control means and said second transferf means for causing a part hook to be transferred by said second transfer means from said second trackway back to said first trackway, and means operable in response to actuation of said first transfer means for causing said second transfer means to become deactivated.

13. In a conveyor system, the combination comprising; first and second spaced trackways, a plurality of part hangers carrying part hooks supported for movement by said trackways, transfer means for transferring part hooks between part hangers carried by said trackways, a plurality of stacked discs carried by and independently rotatable on said part hooks, means including an actuator for causing said transfer means to be operated to transfer part hooks between the part hangers carried by said trackways, said actuator including means positioned in the path of movement of the discs carried by said part hooks and operable thereby, and means on said part hooks for rotating the discs relative to the hooks.

References Cited in the file of this patent

UNITED STATES PATENTS

| | | |
|---|---|---|
| 2,120,052 | Bishop | June 7, 1938 |
| 2,273,383 | Snavely | Feb. 17, 1942 |
| 2,344,155 | McBride et al. | Mar. 14, 1944 |
| 2,751,091 | Freeman | June 19, 1956 |

FOREIGN PATENTS

| | | |
|---|---|---|
| 470,007 | Germany | Jan. 2, 1929 |
| 584,274 | Great Britain | Jan. 10, 1947 |